(12) United States Patent
Kataoka

(10) Patent No.: US 11,222,666 B2
(45) Date of Patent: Jan. 11, 2022

(54) COMMUNICATION DEVICE, MAGNETIC TAPE CARTRIDGE UNIT AND MANUFACTURING METHOD THEREOF, AND NONCONTACT MANAGEMENT METHOD OF MAGNETIC TAPE CARTRIDGE

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/163,593

(22) Filed: Feb. 1, 2021

(65) Prior Publication Data

US 2021/0241796 A1  Aug. 5, 2021

(30) Foreign Application Priority Data

Feb. 4, 2020 (JP) ............................. JP2020-017420
Dec. 7, 2020 (JP) ................................ 2020-203016

(51) Int. Cl.
  *G11B 5/78* (2006.01)
  *G11B 23/023* (2006.01)
  *G06K 19/07* (2006.01)

(52) U.S. Cl.
  CPC ...... *G11B 23/0236* (2013.01); *G06K 19/0708* (2013.01); *G11B 5/78* (2013.01)

(58) Field of Classification Search
  None
  See application file for complete search history.

(56) References Cited

U.S. PATENT DOCUMENTS 6,335,686 B1 * 1/2002 Goff ................. G06K 19/07767
340/572.4
6,967,630 B2 * 11/2005 Tada ....................... H01Q 1/22
343/742

(Continued)

FOREIGN PATENT DOCUMENTS

| WO | 2019/176325 A1 | 9/2019 |
| WO | 2019/198438 A1 | 10/2019 |
| WO | 2019/198527 A1 | 10/2019 |

*Primary Examiner* — William J Klimowicz
(74) *Attorney, Agent, or Firm* — Solaris Intellectual Property Group, PLLC

(57) ABSTRACT

A magnetic tape cartridge unit includes a plurality of magnetic tape cartridges stacked in a height direction. Each magnetic tape cartridge includes an antenna coil formed in a substrate, a communication circuit that communicates with a communicatee using power induced by application of a magnetic field from the communicatee to the antenna coil, and a case having a reference plane being a reference in a height direction. The substrate is inclined at an inclination angle of less than 45 degrees with respect to the reference plane. In a case where the plurality of magnetic tape cartridges are stacked in a predetermined orientation in the height direction, the reference planes of the plurality of magnetic tape cartridges are in parallel, and the inclination angles of the substrates relative to the reference planes and positions of the substrates in the reference planes conform among the plurality of magnetic tape cartridges.

12 Claims, 20 Drawing Sheets

(56) References Cited

U.S. PATENT DOCUMENTS

| | | | | |
|---|---|---|---|---|
| 2003/0094526 A1* | 5/2003 | Lino | ................... | G11B 23/107 242/348 |
| 2006/0139804 A1* | 6/2006 | Kitamura | ......... | G11B 23/08714 360/132 |
| 2009/0109571 A1* | 4/2009 | Hood | ................ | G11B 15/6835 360/134 |

* cited by examiner

COMMUNICATION DEVICE, MAGNETIC TAPE CARTRIDGE UNIT AND MANUFACTURING METHOD THEREOF, AND NONCONTACT MANAGEMENT METHOD OF MAGNETIC TAPE CARTRIDGE

CROSS-REFERENCE TO RELATED APPLICATIONS

This application claims priority under 35 USC 119 from Japanese Patent Application No. 2020-017420 filed on Feb. 4, 2020, and Japanese Patent Application No. 2020-203016 filed on Dec. 7, 2020, the disclosures of which are incorporated by reference herein in their entireties.

BACKGROUND

1. Technical Field

The present disclosure relates to a communication device, a magnetic tape cartridge unit and a manufacturing method thereof, and a noncontact management method of a magnetic tape cartridge.

2. Related Art

WO2019-198438A discloses a non-contact communication medium including a memory unit, a power generation unit, a power monitoring unit, and a capacity controller. In the non-contact communication medium described in WO2019-198438A, the memory unit stores predetermined management information. The power generation unit has a resonance circuit that has an antenna coil and a resonance capacitance unit having a variable capacitance value, and a rectifying circuit that rectifies a resonance output of the resonance circuit, and generates electric power to be supplied to the memory unit. The power monitoring unit has a current adjusting element that is connected in parallel to the rectifying circuit with respect to the resonance circuit and has a variable resistance value, a reference voltage generating source that generates a reference voltage, and an operational amplifier that controls the current adjusting element such that the output voltage of the rectifying circuit becomes equal to the reference voltage. The capacity controller is configured to control the resonance capacitance unit on the basis of the output of the operational amplifier.

WO2019-198527A discloses a non-contact communication medium for a recording medium cartridge including a circuit component, a support substrate, and an antenna coil. In the non-contact communication medium disclosed in WO2019-198527A, the circuit component incorporates a memory unit capable of storing management information related to the recording medium cartridge. The support substrate supports the circuit component. The antenna coil has a coil portion that is electrically connected to the circuit component and is formed on the support substrate, and an inductance value of the coil portion is 0.3 µH or more and 2.0 µH or less.

WO2019-176325A discloses a non-contact communication medium including a voltage generating unit, a memory unit, a clock signal generating unit, and a controller. In the non-contact communication medium disclosed in WO2019-176325A, the voltage generating unit has an antenna coil for transmission and reception, and generates electric power by receiving a signal magnetic field from an external device. The memory unit stores one or more circuit parameters set in the voltage generating unit and predetermined management information. The clock signal generating unit is configured to be able to selectively generate clock signals of two or more different frequencies. The controller is configured to select the frequency of the clock signal supplied from the clock signal generating unit to the memory unit.

SUMMARY

An object of the present disclosure is to improve communication performance in a case where a magnetic field intensity is small. Another object of the present disclosure is to prevent the occurrence of crosstalk.

In order to achieve the above object, a magnetic tape cartridge unit according to the present disclosure includes a plurality of magnetic tape cartridges stacked in a height direction. Each of the magnetic tape cartridges includes an antenna coil formed in a substrate, a communication circuit that communicates with a communicatee using power induced by application of a magnetic field from the communicatee to the antenna coil, and a case in which a reference plane being a reference in the height direction is formed. The substrate is inclined at an inclination angle of less than 45 degrees with respect to the reference plane. In a case where the plurality of magnetic tape cartridges are stacked in a predetermined orientation in the height direction, the reference planes of the plurality of magnetic tape cartridges are in parallel, and the inclination angles of the substrates relative to the reference planes and positions of the substrates in the reference planes conform among the plurality of magnetic tape cartridges.

In a case where crosstalk occurs between the communication circuit and the communicatee, the communication circuit preferably performs a characteristic change processing, and wherein the characteristic change processing disables communication with the communicatee by changing a characteristic.

The characteristic is preferably a clock frequency of a clock signal. In a case where the crosstalk occurs between the communication circuit and the communicatee, the communication circuit preferably increases the clock frequency.

The characteristic is preferably a minimum operation power. In a case where the crosstalk occurs between the communication circuit and the communicatee, the communication circuit preferably increases the minimum operation power.

The characteristic is preferably a level of a response signal to be transmitted to the communicatee. In a case where the crosstalk occurs between the communication circuit and the communicatee, the communication circuit preferably decreases the level of the response signal.

A communication device according to the present disclosure includes a processor, and a memory connected to or incorporated in the processor. The processor transmits a characteristic change command to disable communication between the communication device and a communicatee by changing a characteristic to one or more magnetic tape cartridges, in a case where crosstalk occurs between the communication device and a communication circuit included in each of the magnetic tape cartridges included in a magnetic tape cartridge unit. The magnetic tape cartridge unit includes the magnetic tape cartridges stacked in a height direction. Each of the magnetic tape cartridges has an antenna coil formed in a substrate, a communication circuit that communicates with the communicatee using power induced by application of a magnetic field from the communicatee to the antenna coil, and a case in which a reference plane being a reference in the height direction is formed. The substrate is inclined at an inclination angle of less than 45 degrees with respect to the reference plane. In a case where the magnetic tape cartridges are stacked in a predetermined orientation in the height direction in the magnetic tape cartridge unit, the reference planes of the magnetic tape cartridges are in parallel, and the inclination angles of the substrates relative to the reference planes and positions of the substrates in the reference planes conform among the magnetic tape cartridges.

The characteristic is preferably a clock frequency of a clock signal, a minimum operation power, or a level of a response signal.

A manufacturing method of a magnetic tape cartridge unit including a plurality of magnetic tape cartridges stacked in a height direction, each of the magnetic tape cartridges including an antenna coil formed in a substrate, a communication circuit that communicates with a communicatee using power induced by application of a magnetic field from the communicatee to the antenna coil, and a case in which a reference plane being a reference in the height direction is formed, the manufacturing method according to the present disclosure includes inclining the substrate at an inclination angle of less than 45 degrees with respect to the reference plane; and parallelizing the reference planes of the plurality of magnetic tape cartridges, and conforming the inclination angles of the substrates with respect to the reference planes and the positions of the substrates in the reference planes among the plurality of magnetic tape cartridges, in a case where the plurality of magnetic tape cartridges are stacked in a predetermined orientation in the height direction.

A noncontact management method of a magnetic tape cartridge according to the present disclosure includes applying a magnetic field from a side opposite a reference plane to a coil forming surface of a substrate, an antenna coil being formed in the coil forming surface, in a first environment in which the magnetic tape cartridge is loaded into a magnetic tape drive, a plurality of the magnetic tape cartridges each including an antenna coil formed in a substrate, a communication circuit that communicates with a communicatee using power induced by application of a magnetic field from the communicatee to the antenna coil, and a case in which the reference plane being a reference in a height direction is formed, the substrate being inclined at an inclination angle of less than 45 degrees with respect to the reference plane; and applying a magnetic field from a side across a normal direction of the reference plane and confronting the coil forming surface to the coil forming surface, in a second environment in which a magnetic tape cartridge unit is present outside the magnetic tape drive, the magnetic tape cartridge unit including the plurality of the magnetic tape cartridges stacked in a predetermined orientation in the height direction, the reference planes of the plurality of the magnetic tape cartridges being in parallel, and the inclination angles of the substrates relative to the reference planes and positions of the substrates in the reference planes conforming among the plurality of the magnetic tape cartridges.

The second environment is preferably at least one of a production process of the magnetic tape cartridge unit, a management process of the magnetic tape cartridge unit, and a distribution process to distribute the magnetic tape cartridge unit.

Each of the production process, the management process, and the distribution process includes a process in which a magnetic field is preferably applied to the coil forming surface of each of the plurality of the magnetic tape cartridges included in the magnetic tape cartridge unit.

The communicatee preferably applies the magnetic field to the coil forming surface of each of the plurality of the magnetic tape cartridges, while moving along the normal direction.

BRIEF DESCRIPTION OF THE DRAWINGS

Exemplary embodiments of the present invention will be described in detail based on the following figures, wherein.

DESCRIPTION OF THE PREFERRED EMBODIMENTS

First Embodiment

Hereinafter, embodiments according to the present disclosure will be described in detail with reference to the drawings. For convenience of explanation, in FIG. 1, a loading direction of the magnetic tape cartridge 10 into a magnetic tape drive is denoted by an arrow A, which is denoted by a front direction (front side) of a magnetic tape cartridge 10. Then, a direction of an arrow B orthogonal to the arrow A is denoted by a right direction (right side). In addition, a direction orthogonal to the arrow A direction and the arrow B direction is denoted by an arrow C, which is an upward direction (upper side) of the magnetic tape cartridge 10.

Figure 1:
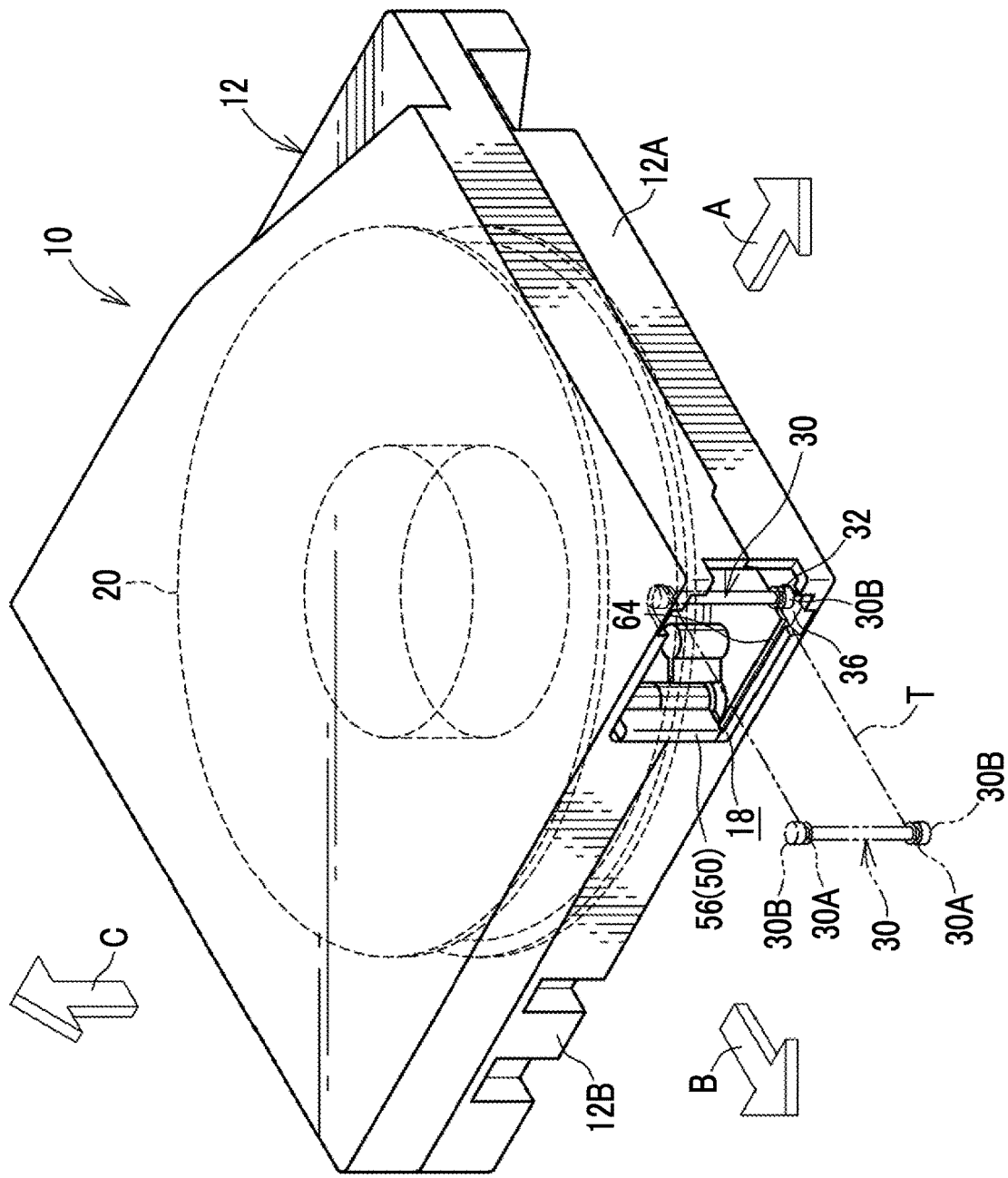
FIG. 1 is a perspective view of a magnetic tape cartridge according to embodiments.
Figure 2:
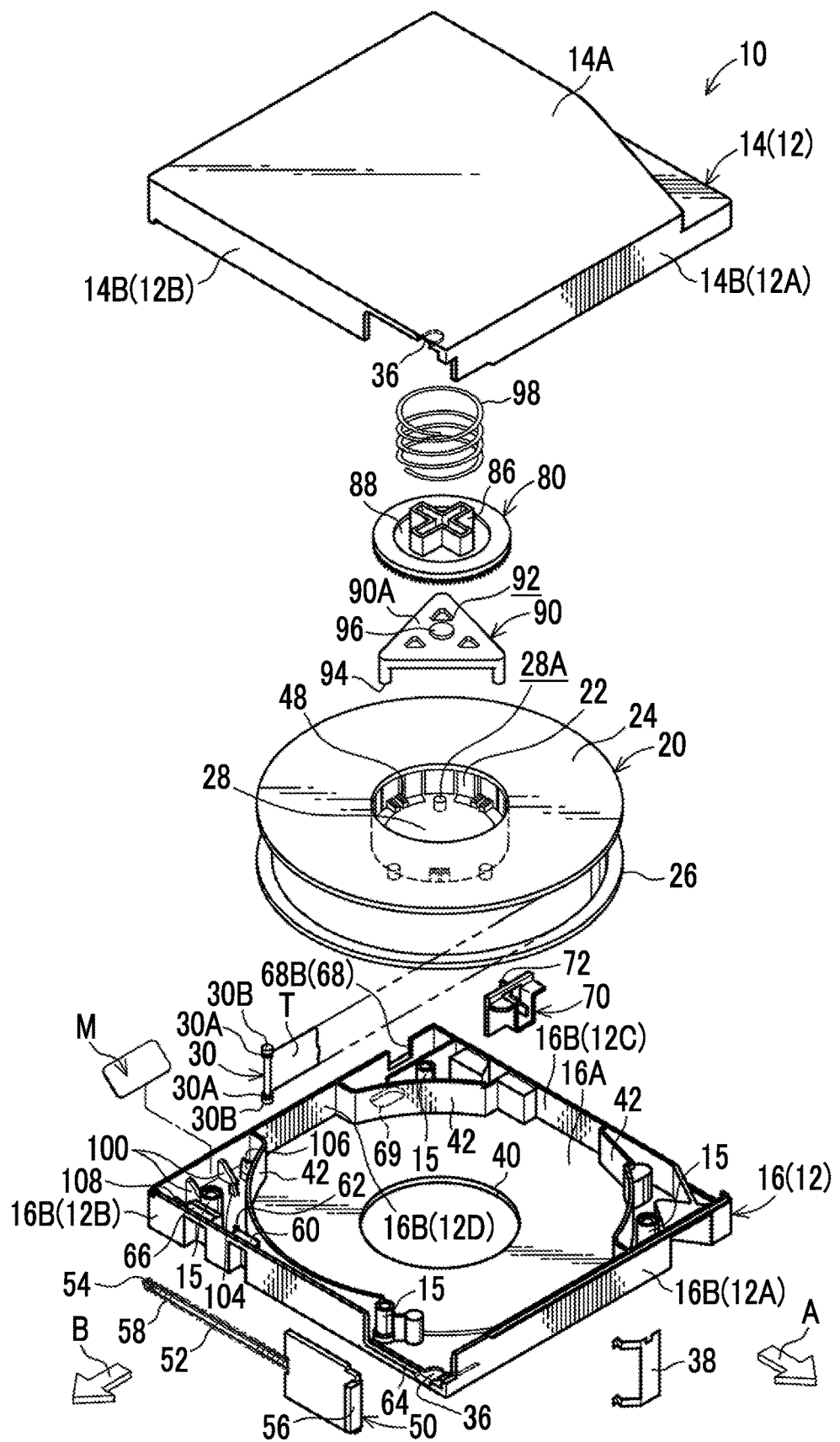
FIG. 2 is an exploded perspective view of the magnetic tape cartridge according to the embodiments as viewed from above.
Figure 3:
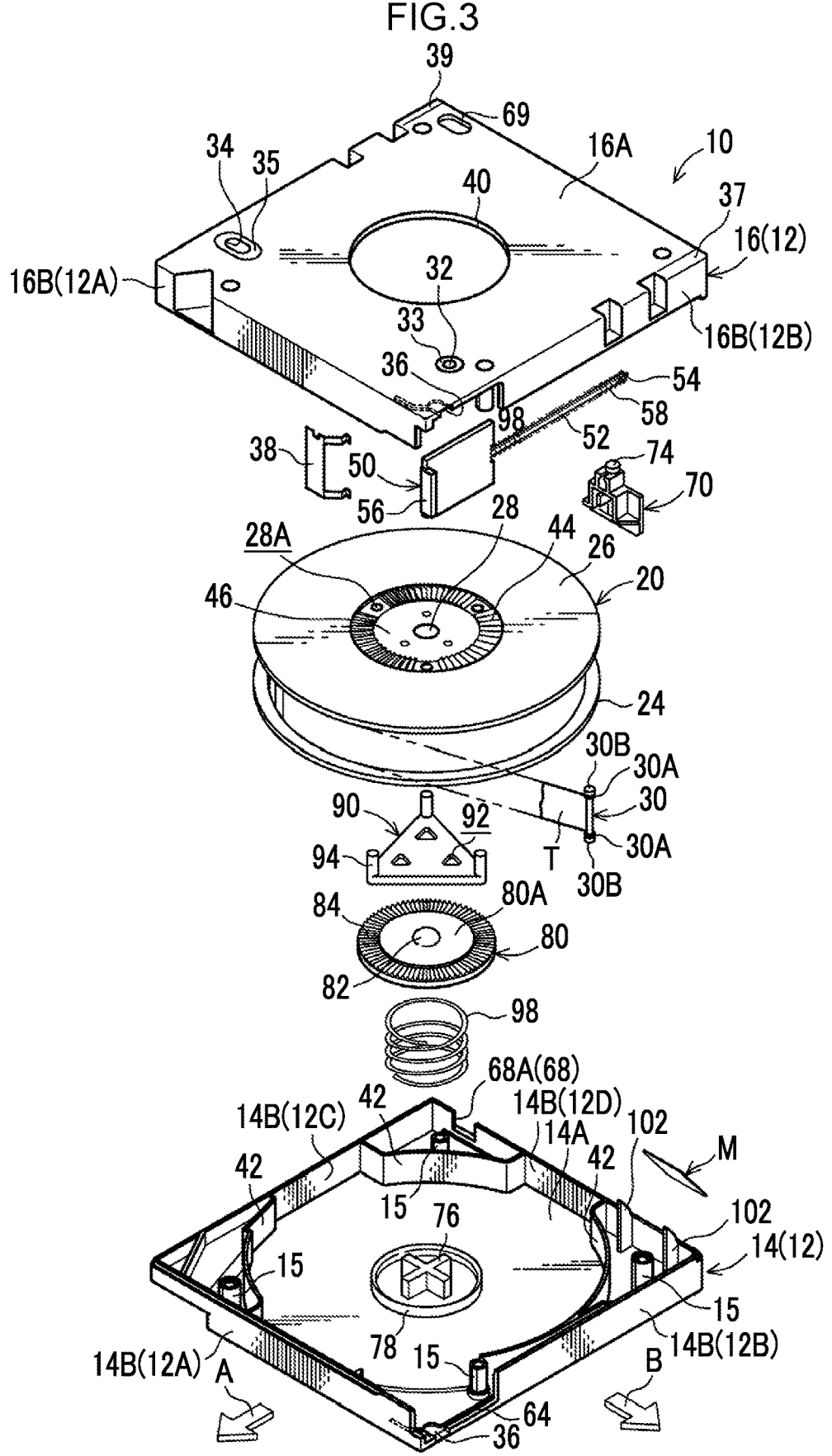
FIG. 3 is an exploded perspective view of the magnetic tape cartridge according to the embodiments as viewed from below.
Figure 4:
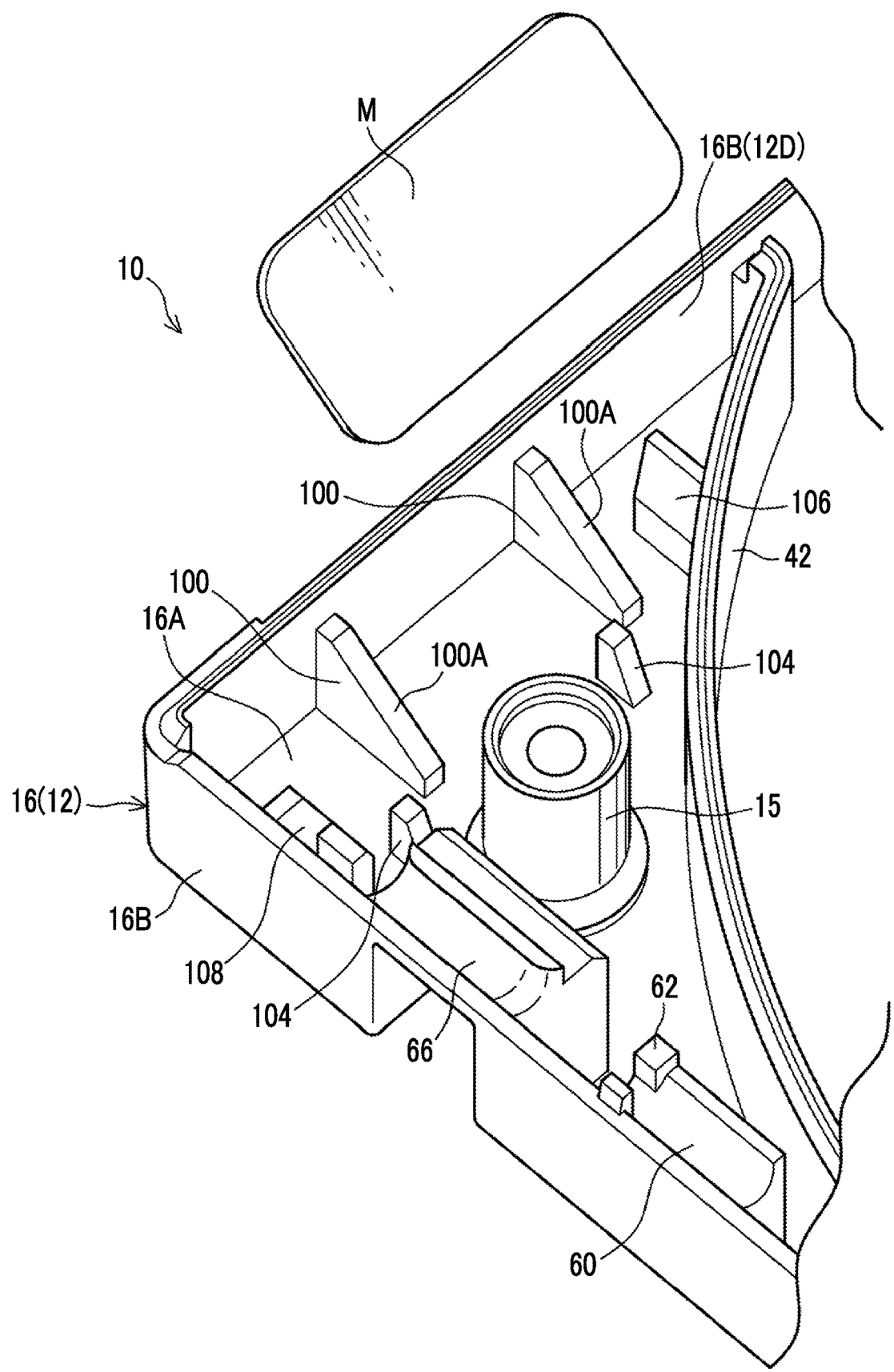
FIG. 4 is a perspective view showing a state before a cartridge memory incorporated in the magnetic tape cartridge according to the embodiments is supported by a support rib.
Figure 5:
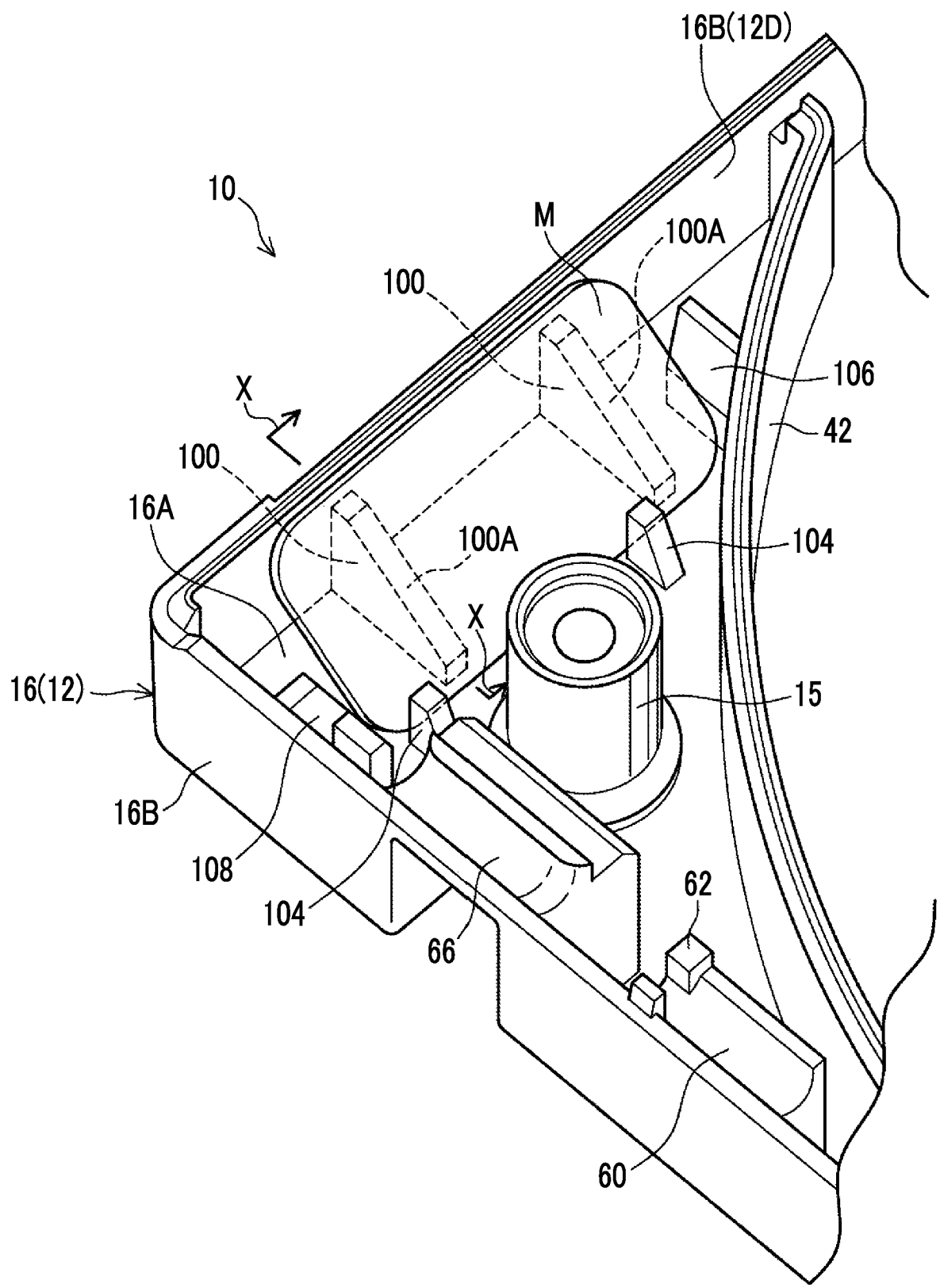
FIG. 5 is a perspective view showing a state after the cartridge memory incorporated in the magnetic tape cartridge according to the embodiments is supported by the support rib.
Figure 6:
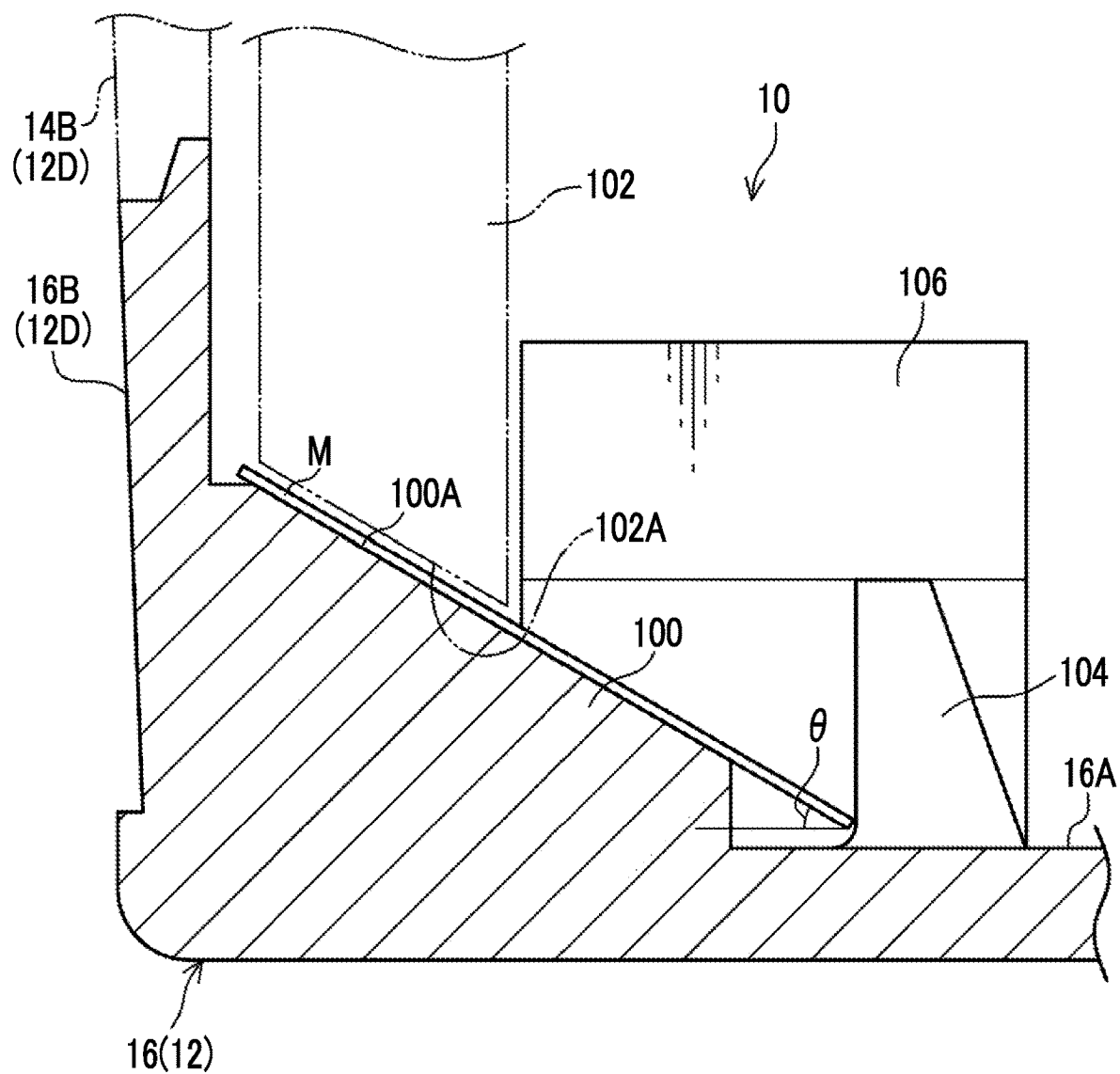
FIG. 6 is a cross-sectional view taken along a line X-X of FIG. 5.

As shown in FIG. 1 to FIG. 3, the magnetic tape cartridge 10 has a case 12 having a substantially rectangular box shape. The case 12 is configured by joining an upper case 14 and a lower case 16 made of resin such as polycarbonate (PC), and the like, by ultrasonic welding, screw fastening, and the like, in such a state that a peripheral wall 14B erected on a peripheral edge of a top plate 14A and a peripheral wall 16B erected on a peripheral edge of a bottom plate 16A abut on each other.

That is, for example, in the upper case 14 and the lower case 16, each of screw bosses 15 is formed in the vicinity of each corner portion, and screws (not shown) are screwed from a lower surface side of the lower case 16 to the screw bosses 15 to assemble the case 12. Only one reel 20 is accommodated inside the case 12.

The reel 20 is configured by integrally molding a bottomed cylindrical reel hub 22 constituting an axial center portion and a lower flange 26 provided at a lower end portion thereof, and by ultrasonically welding an upper flange 24 to an upper end portion of the reel hub 22. A magnetic tape T serving as an information recording and reproducing medium is wound around the outer peripheral surface of the reel hub 22, and an end portion in the width direction of the wound magnetic tape T is held by the upper flange 24 and the lower flange 26.

On the lower surface of the bottom wall 28 of the reel hub 22, a reel gear 44 is formed in an annular shape, and in a central portion of the lower case 16, a gear opening 40 for exposing the reel gear 44 to the outside is drilled. The reel gear 44 exposed from the gear opening 40 is engaged with a driving gear (not shown) formed on a rotary shaft (not shown) of a magnetic tape drive 110 (refer to FIG. 7) and rotationally driven, so that in the case 12, the reel 20 is relatively rotatable with respect to the case 12.

On the radially inner side of the reel gear 44 on the lower surface of the bottom wall 28, a reel plate 46, which is an annular metal plate made of a magnetic material, is coaxially and integrally fixed by insert molding, and is attracted and held by a magnetic force of an annular magnet (not shown) provided on the rotary shaft of the magnetic tape drive 110. Further, the reel 20 is partially projected from the inner surfaces of the upper case 14 and the lower case 16, respectively, and is held so as not to be rattled by a floating restricted wall 42 as an inner wall on a circular locus coaxial with the gear opening 40.

In a right wall 12B of the case 12, an opening 18 for drawing out the magnetic tape T wound on the reel 20 is formed, and at a free end portion of the magnetic tape T drawn out from the opening 18, a leader pin 30 to be drawn out while being locked by a drawing member (not shown) of the magnetic tape drive 110 is fixed. At both end portions of the leader pin 30, protruding from the end portion in the width direction of the magnetic tape T, an annular groove 30A is formed, and an annular groove 30A is locked to a hook or the like of the drawing member. Therefore, in a case where the magnetic tape T is drawn out, the hook or the like does not come into contact with the magnetic tape T and is not damaged.

In addition, on the inside of the opening 18 of the case 12, that is, on the inner surface of the top plate 14A of the upper case 14 and the inner surface of the bottom plate 16A of the lower case 16, a pair of upper and lower pin holding portion 36 for positioning and holding the leader pin 30 in the case 12 are provided. The pin holding portion 36 has a substantially semicircular shape in which the drawing out side of the magnetic tape T is opened, and both end portions 30B of the leader pin 30 in an upright state can enter and leave the pin holding portion 36 from the opening side.

In the vicinity of the pin holding portion 36, a plate spring 38 is fixedly disposed, and a bifurcated distal end portion of the plate spring 38 is respectively engaged with both upper and lower end portions 30B of the leader pin 30 to hold the leader pin 30 in the pin holding portion 36. It should be noted that in a case where the leader pin 30 enters and leaves the pin holding portion 36, the distal end portion of the plate spring 38 is elastically deformed appropriately to allow the movement of the leader pin 30.

Further, the opening 18 is opened and closed by a door 50. The door 50 is formed into a substantially rectangular plate shape having a size capable of closing the opening 18, and a groove portion 64 for slidably fitting an upper and lower end portion of the door 50 is formed in the top plate 14A and the bottom plate 16A inside the opening 18 so as to be movable along the right wall 12B of the case 12.

A shaft 52 is projected from the center of a rear end portion of the door 50, and a coil spring 58 is inserted into the shaft 52. An expansion portion 54 is formed at the rear end of the shaft 52 to prevent the coil spring 58 from falling off. Further, in the lower case 16, a support base 60 having a locking portion 62 for locking the rear end of the coil spring 58 inserted into the shaft 52 is projected.

Accordingly, the door 50 is configured such that the shaft 52 is slidably supported on the support base 60, and the rear end of the coil spring 58 is locked to the locking portion 62, so that the door is always biased by a biasing force of the coil spring 58 in the closing direction of the opening 18. It should be noted that in a case where the opening 18 is opened, it is preferable that a support base 66 that supports the shaft 52 is further projected on the rear side of the support base 60.

Further, a convex portion 56 for opening and closing operation is projected outward from the front end portion of the door 50. In a case where the magnetic tape cartridge 10 is loaded into the magnetic tape drive 110, the convex portion 56 engages with an opening and closing member (not shown) on the side of the magnetic tape drive 110. As a result, the door 50 is configured to be opened against the biasing force of the coil spring 58.

In addition, as shown in FIG. 3, in the bottom plate 16A of the lower case 16, a pair of reference holes 32 and 34, which are non-penetrating holes, are formed so as to be separated in the left-right direction and at the same position in the front-rear direction. The reference hole 32 on the right wall 12B side is formed in a substantially circular shape as viewed from the bottom surface, and the reference hole 34 on the left wall 12C side is formed in a substantially elliptical shape long in the left-right direction as viewed from the bottom surface.

In a case where the magnetic tape cartridge 10 is loaded into the magnetic tape drive 110, the reference hole 32 and the reference hole 34 are respectively inserted with positioning members (not shown) provided in the magnetic tape drive 110. Therefore, in the magnetic tape drive 110, the front-rear direction and the left-right direction of the magnetic tape cartridge 10 (the case 12) are positioned.

In the bottom plate 16A, around the reference hole 32 and the reference hole 34, a circular reference surface 33 and an elliptical reference surface 35 which are mirror-finished are formed. In a rear end angle portion of the bottom plate 16A, a rectangular (a rectangular shape with the front-rear direction as the longitudinal direction) reference surface 37 and a reference surface 39 which are mirror-finished are also formed, respectively. It should be noted that each of the reference surfaces 33, 35, 37, and 39 is on the same planar surface.

In a case where the magnetic tape cartridge 10 is loaded into the magnetic tape drive 110, each of the reference surface 33 and the reference surface 35, and the reference surface 37 and the reference surface 39 abuts on positioning surfaces (not shown) provided on the magnetic tape drive 110. As a result, in the magnetic tape drive 110, the thickness direction (height direction) of the magnetic tape cartridge 10 (the case 12) is positioned.

As shown in FIG. 2 and FIG. 3, in the left rear portion of the case 12, a write protect 70 for enabling or disabling recording on the magnetic tape T is provided so as to be slidable in the left-right direction. A rear wall 12D of the case 12 is formed with an open hole 68 for protruding an operation protrusion 72 for manually operating the write protect 70.

In a case where the upper case 14 and the lower case 16 are joined, the open hole 68 is configured to be formed by a notch portion 68A formed in a peripheral wall 14B of the upper case 14 and a notch portion 68B formed in a peripheral wall 16B of the lower case 16. In addition, the lower case 16 is drilled with a long hole 69 in which the protruding portion 74 of the write protect 70 is exposed long in the left-right direction.

In a case where the magnetic tape cartridge 10 is loaded in the magnetic tape drive 110, the magnetic tape drive 110 detects the position of the write protect 70 to automatically determine whether recording on the magnetic tape T is possible or not. It should be noted that the protruding portion 74 of the write protect 70 does not protrude from the lower surface of the lower case 16.

On the peripheral edge of the upper surface of the bottom wall 28 of the reel hub 22, a plurality of (at equal intervals) engaging gears 48 (for example, 3 at intervals of 120 degrees) are erected with a predetermined gap therebetween, and between the engaging gears 48, a plurality of (in this case, 3 at intervals of 120 degrees) through holes 28A are drilled at predetermined positions on the reel gear 44. Then, a disk-shaped braking member 80 molded from a resin material is inserted inside the reel hub 22.

On the peripheral edge of the lower surface 80A of the braking member 80, a braking gear 84 capable of engaging with the engaging gear 48 is annularly formed. On the upper surface of the braking member 80, an engaging protrusion 86 having a substantially cross shape in plan view into which a rotation restricting rib 76 having a substantially cross shape in plan view projected downward from the inner surface of the top plate 14A of the upper case 14 is inserted is erected so as to be slightly higher than the height of the rotation restricting rib 76. As a result, the braking member 80 is made immovable with respect to the case 12 (the upper case 14) and is movable in the up-down direction in the reel hub 22.

In addition, a compression coil spring 98 is arranged between the upper case 14 and the braking member 80. That is, one end of the compression coil spring 98 is disposed in a state of abutting on the inside of an annular protrusion 78 projected outside the rotation restricting rib 76 of the upper case 14 (between the rotation restricting rib 76 and the annular protrusion 78), and the other end is arranged in a state of abutting on the annular groove 88 provided on the upper surface of the braking member 80. The braking member 80 is always biased downward by the biasing force of the compression coil spring 98.

Therefore, in a case where it is not in use (in a case where the magnetic tape drive 110 is not loaded), the magnetic tape cartridge 10 is in a state in which the braking gear 84 is always engaged with the engaging gear 48, and is in a rotation locked state in which the relative rotation of the reel 20 with respect to the case 12 is prevented. It should be noted that at this time, the reel 20 is pressed against the lower case 16 by this biasing force to expose the reel gear 44 from the gear opening 40.

In addition, inside the reel hub 22 and on the lower side (between the bottom wall 28 and the braking member 80) of the braking member 80, a releasing member 90 formed of a resin material and having a substantially regular triangular shape in plan view is inserted. The releasing member 90 is drilled with a plurality of through holes 92 having a predetermined shape (the figure shows three hexagons) at appropriate positions, thereby reducing the weight of the releasing member 90. On the lower surface of the releasing member 90 and at the respective apex portions, leg portions 94 which are inserted through the through holes 28A and protrude from the lower surface of the bottom wall 28 to the reel gear 44 at a predetermined height are projected.

A planar support convex portion 96 in the center of the upper surface 90A of the releasing member 90 is formed, and a substantially hemispherical releasing protrusion 82 projecting from the center of the lower surface 80A of the braking member 80 abuts on the planar support convex portion 96 (refer to FIG. 2 and FIG. 3). As a result, a contact area between the braking member 80 and the releasing member 90 is reduced, and the sliding resistance during use (in a case where the reel 20 is rotated) is reduced. It should be noted that as the material of the braking member 80, for example, polyacetal (POM) is used, and as the material of the releasing member 90, for example, polybutylene terephthalate (PBT) is used.

In addition, as shown in FIG. 2 and FIG. 3, a cartridge memory M as a non-contact type communication medium is obliquely disposed at a predetermined angle θ at the right rear portion of the case 12. The cartridge memory M is formed in a substantially rectangular flat plate (substantially rectangular shape in plan view) whose longitudinal direction is the left-right direction, and has an IC (Integrated Circuit) chip (not shown) in which various information such as recording capacity and recording format is stored, and an antenna (not shown) which receives a magnetic field radiated from a non-contact type reading and writing apparatus 112 (refer to FIG. 7) provided in the magnetic tape drive 110. It should be noted that the antenna is provided on one surface (lower surface) of the cartridge memory M.

As shown in FIG. 2 and FIG. 4 to FIG. 6, on the inner surfaces of the bottom plate 16A and the peripheral wall 16B (the rear wall 12D) of the lower case 16 and on a screw boss 15 and the support base 66 of the right rear side, two (in pairs) support ribs 100 as support members for obliquely disposing the cartridge memory M at a predetermined angle θ (for example, θ=30 degrees) are projected integrally and at a predetermined interval in the left-right direction.

The support rib 100 is formed in a substantially right triangular shape in a side view, and an upper surface of the lower case 16 inclined at a predetermined angle θ with respect to the reference surfaces 33, 35, 37, and 39 (refer to FIG. 3) is a support surface 100A for supporting one surface (lower surface) of the cartridge memory M. It should be noted that the predetermined angle θ of the support rib 100 with respect to the reference surfaces 33, 35, 37, and 39 is less than θ=45 degrees, preferably θ=40 degrees or less, and more preferably θ=30 degrees or less.

In addition, on the bottom plate 16A on the front side of the support rib 100, two (in pairs) position regulating ribs 104 as position regulating members for regulating the position of the lower end portion of the cartridge memory M are projected integrally and at a predetermined interval in the left-right direction. In addition, on the bottom plate 16A on the left side of the support rib 100, position regulating ribs 106 as position regulating members for regulating the position of the left end portion of the cartridge memory M are integrally projected. Further, on the bottom plate 16A on the right side of the support rib 100, position regulating ribs 108 as position regulating members for regulating the position of the right end portion of the cartridge memory M are integrally projected. As described above, the positions of the cartridge memory M in the front-rear direction and the left-right direction are regulated.

As shown in FIG. 3, on the inner surface of the top plate 14A of the upper case 14 and on the rear side of the screw boss 15 on the right rear side, two (in pairs) holding ribs 102 serving as position regulating members for regulating the position of the cartridge memory M from the upper side are projected integrally and at a predetermined interval in the left-right direction. The holding rib 102 is formed in a substantially trapezoidal shape in a side view, and the lower end surface 102A thereof is obliquely cut out in accordance with a predetermined angle θ in the support rib 100.

Accordingly, the lower end surface 102A of the holding rib 102 faces or comes into light contact with the other surface (upper surface) of the cartridge memory M with a very small gap in a case where the lower case 16 and the upper case 14 are joined, and regulates the position of the cartridge memory M toward the support rib 100. Thus, regardless of the attitude of the magnetic tape cartridge 10 (the case 12), the cartridge memory M is held without being deviated from the support surface 100A, and is stably and obliquely disposed at a predetermined angle θ.

Next, the operation of the magnetic tape cartridge 10 according to the present embodiment configured as described above will be described.

Figure 7:
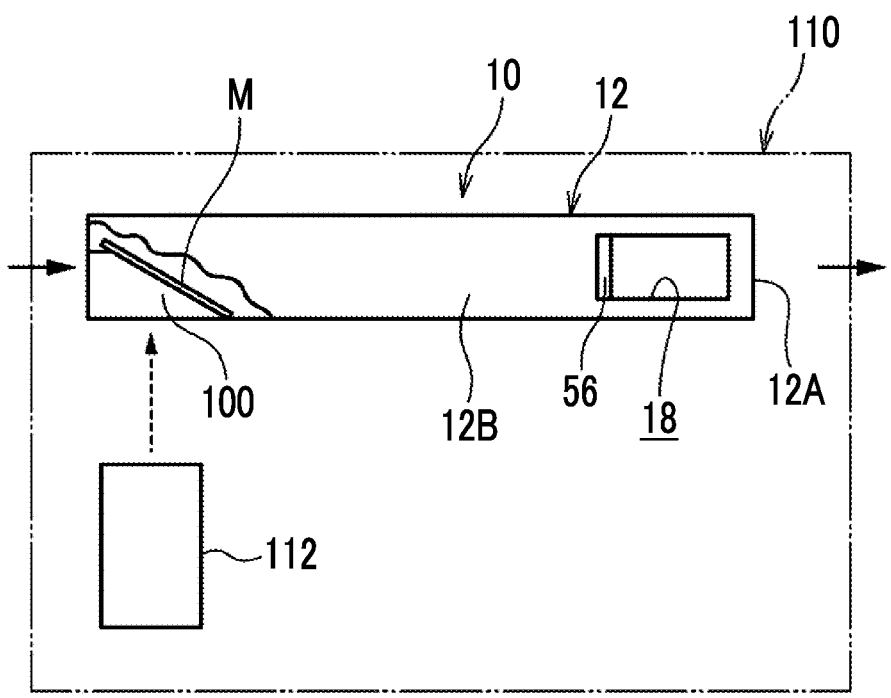
FIG. 7 is a schematic view showing an access state to the cartridge memory in a case where the magnetic tape cartridge according to the embodiments is loaded in a magnetic tape drive.

As shown in FIG. 7, the magnetic tape cartridge 10 is loaded into the magnetic tape drive 110 with a front wall 12A at the head. Then, the door 50 slides to open the opening 18, and the positioning members (not shown) provided in the magnetic tape drive 110 are relatively inserted into each of the reference hole 32 and the reference hole 34.

Then, each of the reference surface 33, the reference surface 35, the reference surface 37, and the reference surface 39 abuts on the positioning surfaces (not shown) provided on the magnetic tape drive 110. Therefore, in the magnetic tape drive 110, the front-rear direction, the left-right direction, and the thickness direction (the height direction) of the magnetic tape cartridge 10 (the case 12) are positioned.

In addition, a rotary shaft (not shown) provided in the magnetic tape drive 110 relatively enters through the gear opening 40, and the driving gear (not shown) is engaged with the reel gear 44. Then, with the operation of engaging the driving gear with the reel gear 44, the leg portions 94 protruding on the reel gear 44 is pushed up against the biasing force of the compression coil spring 98, the braking member 80 is pushed up via the releasing member 90, and the engagement between the braking gear 84 and the engaging gear 48 is released.

Then, in a state where the driving gear and the reel gear 44 are completely engaged with each other, the reel plate 46 is attracted and held by the magnetic force of the annular magnet provided inside the driving gear. As a result, the reel 20 is brought into an unlocked state in which the reel 20 is relatively rotatable with respect to the case 12 in the case 12 while maintaining the engagement of the reel gear 44 with the driving gear.

Then, the non-contact type reading and writing apparatus 112 provided in the magnetic tape drive 110 non-contactly accesses the IC chip of the cartridge memory M from the lower side. That is, a magnetic field is applied from the non-contact type reading and writing apparatus 112, and the antenna of the cartridge memory M receives the magnetic field. As a result, an electromotive force is generated, and the non-contact type reading and writing apparatus 112 reads various information stored in the IC chip and writes various information in the IC chip.

Here, the cartridge memory M is accurately and obliquely disposed by the support rib 100 provided on the lower case 16, the position regulating ribs 104, 106, and 108 and the holding ribs 102 provided on the upper case 14 at an angle θ (for example, θ=30 degrees) of less than 45 degrees with respect to the reference surfaces 33, 35, 37, and 39. In other words, the cartridge memory M is stably held at an angle θ without deviating the support surface 100A.

Therefore, compared with the case where the cartridge memory M is obliquely disposed with respect to the reference surfaces 33, 35, 37, and 39 at an angle of 45 degrees or more, it is possible to receive more magnetic fields radiated from the non-contact type reading and writing apparatus 112 (it is possible to generate more electromotive force).

Thus, even in a case where the intensity of the magnetic field radiated from the non-contact type reading and writing apparatus 112 is small (even in a case where the communication distance is long), the communication performance with respect to the cartridge memory M can be improved. That is, the various information can be accurately read or written by the non-contact type reading and writing apparatus 112.

It should be noted that in a case of recording data on the magnetic tape T or reproducing data on the magnetic tape T, from the opened opening 18, the drawing member (not shown) provided in the magnetic tape drive 110 enters the case 12, and the leader pin 30 positioned and held by the pin holding portion 36 is gripped and drawn out. At this time, since the rotation locked state of the reel 20 is released, the reel 20 can rotate with the pull-out operation of the leader pin 30.

The leader pin 30 extracted from the opening 18 is accommodated in a take-up reel (not shown) provided in the magnetic tape drive 110. By rotating and driving the take-up reel and the reel 20 synchronously, the magnetic tape T is taken up by the take-up reel and sequentially drawn out from the case 12, and data is recorded or reproduced by a recording and reproducing head (not shown) arranged along a predetermined tape path.

Figure 8:
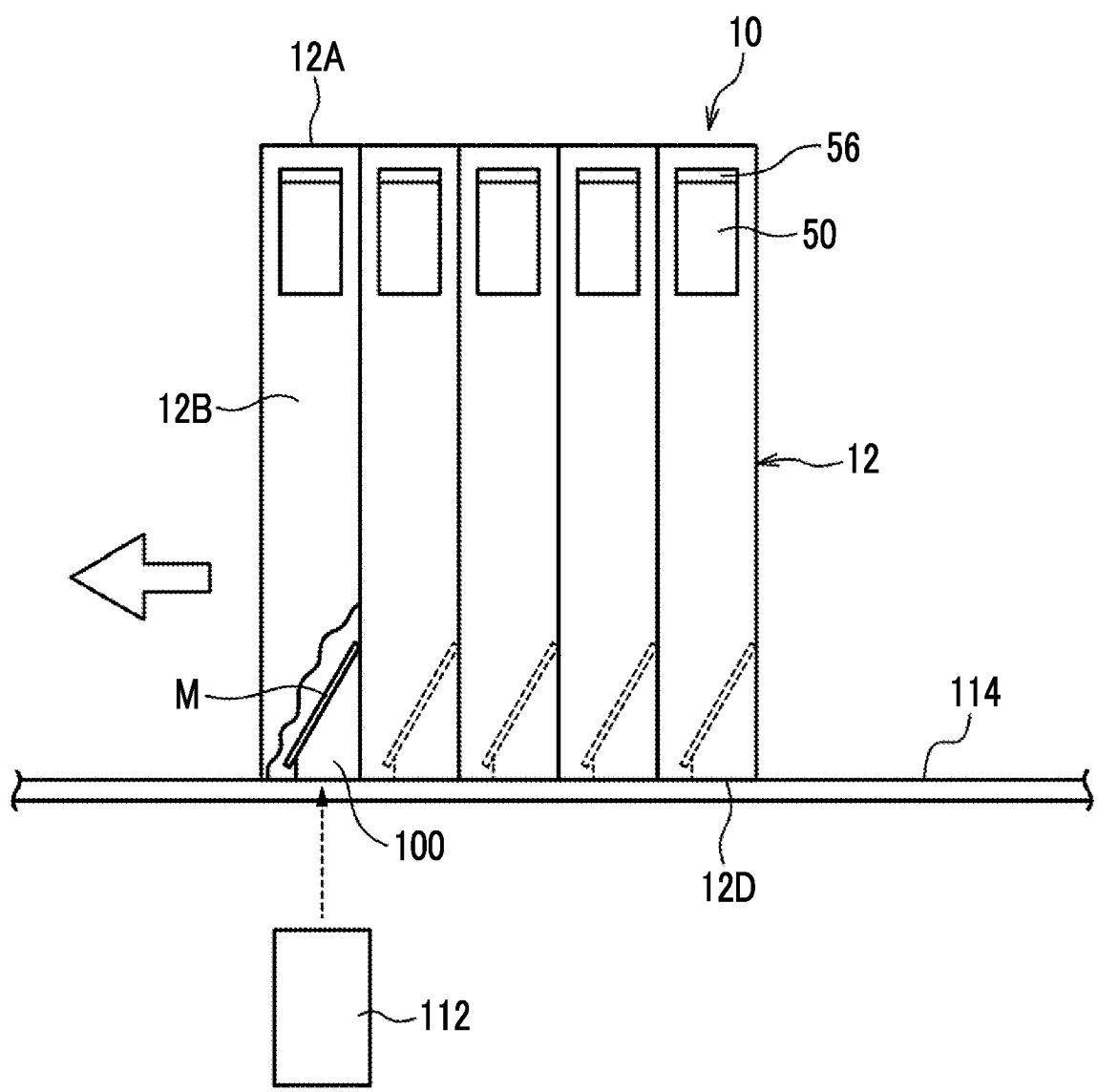
FIG. 8 is a schematic view showing an access state to the cartridge memory in a case where the magnetic tape cartridges according to the embodiments are transported in a production process.

On the other hand, as shown in FIG. 8, in the production process of the magnetic tape cartridge 10, a plurality of (for example, five volumes) magnetic tape cartridges 10 may be transported by a transport belt 114 in a boxed state, for example, in a state where the rear wall 12D is placed down and arranged without a gap in the thickness direction. In this case, the cartridge memories M incorporated in each magnetic tape cartridge 10 are disposed relatively close to each other.

At the time of this transfer, the non-contact type reading and writing apparatus 112 may non-contactly access the IC chip of the cartridge memory M from the lower side of the transport belt 114. Here, in a case where the cartridge memory M is disposed with respect to the reference surfaces 33, 35, 37, and 39 at an angle of 45 degrees or more, the sensitivity from the rear wall 12D side becomes good, and the possibility of accessing not the cartridge memory M of the magnetic tape cartridge 10 to be accessed but the cartridge memory M of the magnetic tape cartridge 10 adjacent thereto (a crosstalk occurs) becomes high.

However, in a case where the cartridge memory M is disposed with respect to the reference surfaces 33, 35, 37, and 39 at an angle $\theta$ of less than 45 degrees (for example, $\theta=30$ degrees), the sensitivity from the rear wall 12D side is lowered, and the possibility of accessing the cartridge memory M of the magnetic tape cartridge 10 adjacent to the magnetic tape cartridge 10 to be accessed (a crosstalk occurs) is lowered.

That is, it is possible to accurately access only the cartridge memory M of the magnetic tape cartridge 10 to be accessed (the occurrence of crosstalk can be suppressed or prevented). Therefore, in the production process of the magnetic tape cartridge 10, the productivity can be improved without incurring equipment costs.

As described above, the magnetic tape cartridge 10 according to the present embodiment has been described on the basis of the drawings, but the magnetic tape cartridge 10 according to the present embodiment is not limited to those shown in the drawings, and can be appropriately redesigned within a range not deviating from the gist of the present disclosure. For example, the position regulating ribs 104 and the holding ribs 102 are provided in two pieces each, but one or three or more may be provided.

In addition, the non-contact type reading and writing apparatus 112 is not limited to a configuration in which the magnetic field is irradiated to the cartridge memory M from the lower side, but may be configured in which the magnetic field is irradiated to the cartridge memory M from the upper side. Further, the door 50 is not limited to a flat plate-shaped door having a linear moving locus in a plan view, and may be, for example, a substantially arc-shaped door having a substantially arc-shaped moving locus in a plan view.

As described above, as shown in FIG. 8, the plurality of magnetic tape cartridges 10 stacked in the height direction (corresponding to a horizontal direction in FIG. 8) constitute a united magnetic tape cartridge unit. Each of the magnetic tape cartridges 10 has the cartridge memory M and the case 12 in which a reference plane serving as a reference in the height direction is formed. The reference plane is, for example, the surface of the above-described bottom plate 16A on a side of the cartridge memory M.

Although details will be described in a second embodiment, the cartridge memory M has an antenna coil and a communication circuit. The antenna coil is formed in a substrate. The communication circuit communicates with a communicatee using power induced by application of a magnetic field from the non-contact type reading and writing apparatus 112, being the communicatee, to the antenna coil. As described above, the substrate is inclined at an angle $\theta$ of less than 45 degrees with respect to the reference plane (see FIG. 6).

As shown in FIG. 8, in a case where the plurality of magnetic tape cartridges 10 are stacked in a default orientation in the height direction, the reference planes are in parallel, and the inclination angle $\theta$ of the substrate with respect to the reference plane and the position of the substrate in the reference plane correspond among the plurality of magnetic tape cartridges 10. The default orientation refers to, for example, a state in which among the plurality of magnetic tape cartridges 10, the top plates 14A (see FIG. 2) are oriented in the same direction, and the front walls 12A, the right walls 12B, the left walls 12C, and the rear walls 12D are each coplanar.

A manufacturing method of the magnetic tape cartridge unit according to the present disclosure includes inclining the substrate in which the antenna coil is formed at the angle $\theta$ of less than 45 with respect to the reference plane; and in a case where the plurality of magnetic tape cartridges 10 are stacked in the default orientation in the height direction, parallelizing the reference planes of the plurality of magnetic tape cartridges 10, and conforming the inclination angles $\theta$ of the substrates with respect to the reference planes and the positions of the substrates in the reference planes among the plurality of magnetic tape cartridges 10.

Second Embodiment

Next, the second embodiment of the present invention will be described. In this embodiment, in a case where the above-described crosstalk occurs in a magnetic tape cartridge 10 other than a magnetic tape cartridge 10 to be accessed by the non-contact type reading and writing apparatus 112, characteristic change processing is performed in order to disable communication operation of the communication circuit in the cartridge memory M. The communication circuit is constituted of an IC chip 122 (see FIG. 9), as described below.

Figure 9:
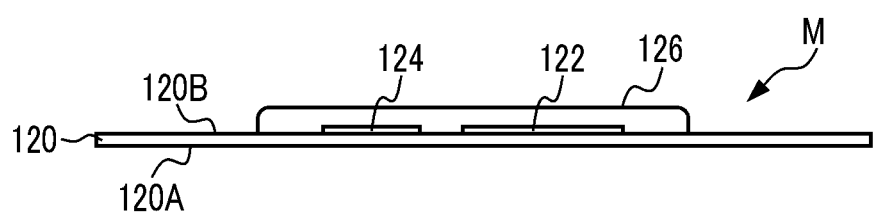
FIG. 9 is a schematic side view of the cartridge memory in the magnetic tape cartridge according to the embodiments.

As an example, as shown in FIG. 9, the cartridge memory M includes a substrate 120. The substrate 120 is disposed on the holding ribs 102 such that a back surface 120A contacts the support surfaces 100A (see FIG. 4). On a front surface 120B of the substrate 120, the IC chip 122 and a capacitor 124 are mounted. The IC chip 122 and the capacitor 124 are bonded to the front surface 120B. The IC chip 122 and the capacitor 124 are sealed with a sealing member 126. The sealing member 126 is, for example, an ultraviolet curable resin, which is cured by reaction with ultraviolet rays.

Figure 10:
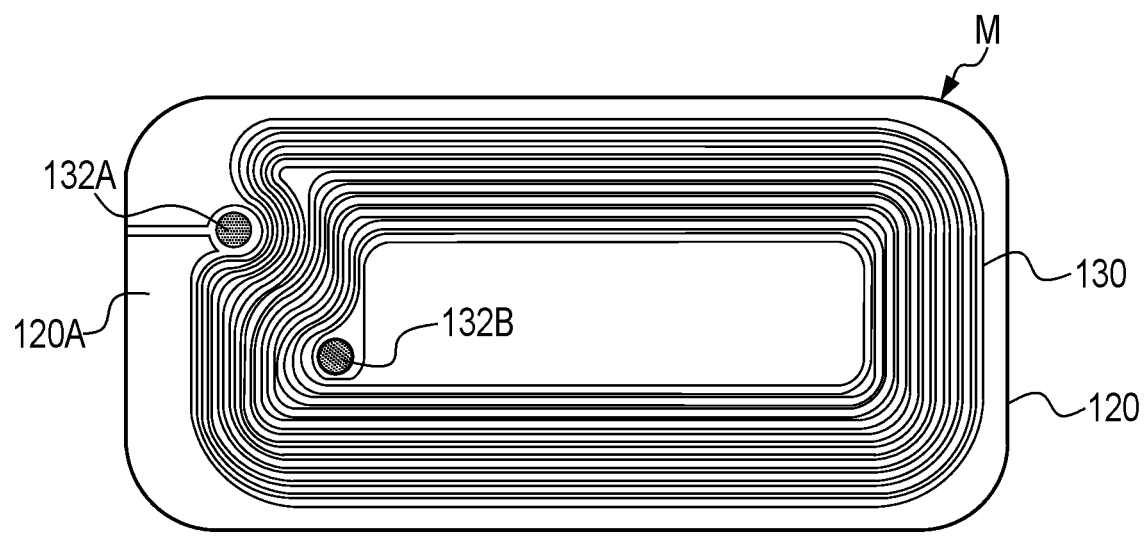
FIG. 10 is a schematic plan view of the cartridge memory in the magnetic tape cartridge according to the embodiments as viewed from a back surface side.

As an example, as shown in FIG. 10, an antenna coil 130 is formed in a loop shape on the back surface 120A of the substrate 120. Here, as a material of the antenna coil 130, copper foil is adopted. The copper foil is merely an example, and for example, another type of conductive material, such as aluminum foil, may be used. The antenna coil 130 induces power by the action of the magnetic field (see FIGS. 7 and 8) applied from the non-contact type reading and writing apparatus 112.

A first conduction portion 132A and a second conduction portion 132B are provided on the back surface 120A of the substrate 120. The first conduction portion 132A and the second conduction portion 132B have solders and electrically connect both end portions of the antenna coil 130 to the IC chip 122 and the capacitor 124 on the front surface 120B.

Figure 11:
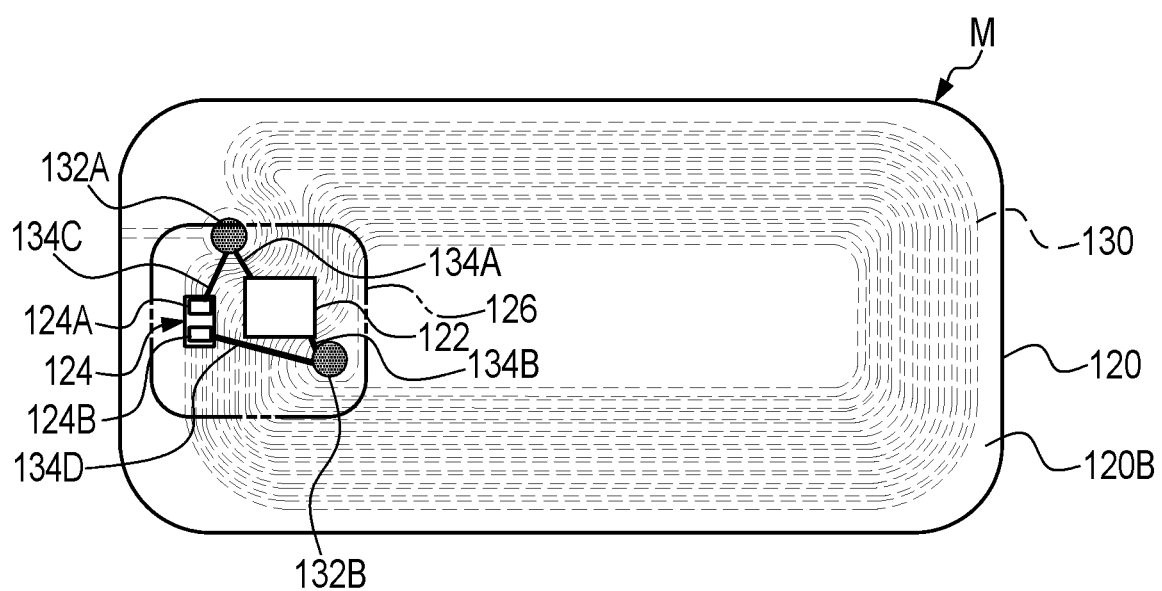
FIG. 11 is a schematic plan view of the cartridge memory in the magnetic tape cartridge according to the embodiments as viewed from a front surface side.

As an example, as shown in FIG. 11, on the front surface 120B of the substrate 120, the IC chip 122 and the capacitor 124 are electrically connected to each other using a wired connection method. Specifically, one terminal of a positive electrode terminal and a negative electrode terminal of the IC chip 122 is connected to the first conduction portion 132A through a wiring 134A, and the other terminal is connected to the second conduction portion 132B through a wiring 134B. The capacitor 124 has a pair of electrodes. In the example shown in FIG. 11, a pair of electrodes correspond to electrodes 124A and 124B. The electrode 124A is connected to the first conduction portion 132A through a wiring 134C, and the electrode 124B is connected to the second conduction portion 132B through a wiring 134D.

Figure 12:
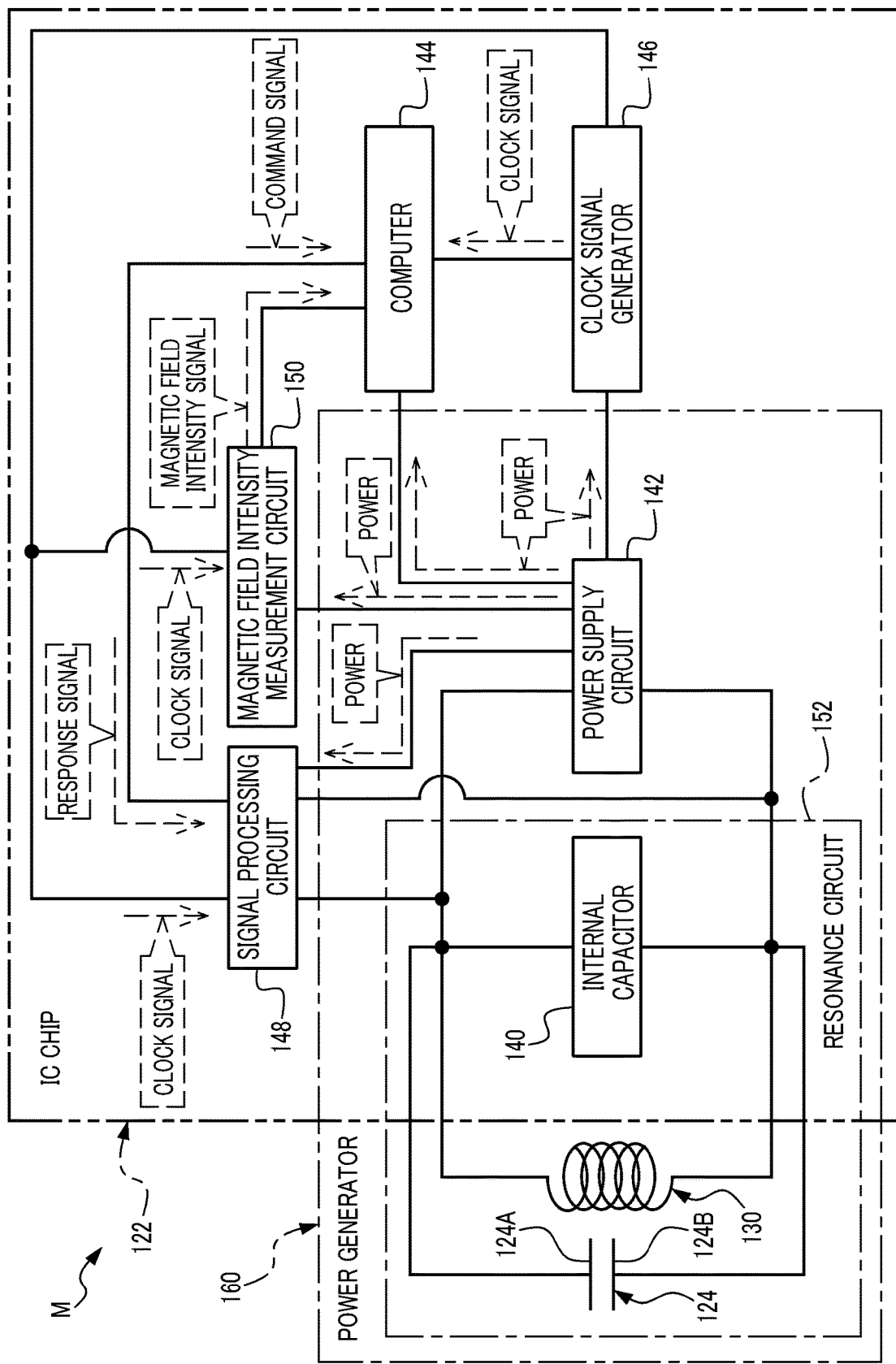
FIG. 12 is a schematic circuit diagram showing an example of circuitry of the cartridge memory in the magnetic tape cartridge according to the embodiments.

As an example, as shown in FIG. 12, the IC chip 122 includes an internal capacitor 140, a power supply circuit 142, a computer 144, a clock signal generator 146, a signal processing circuit 148, and a magnetic field intensity measurement circuit 150. The IC chip 122 is a general-use IC chip that is usable for purposes other than the magnetic tape cartridge 10, and performs communication operation with the non-contact type reading and writing apparatus 112 in a case where a program for the magnetic tape cartridge is installed thereon. The IC chip 122 is an example of a "communication circuit" according to the technique of the present disclosure.

The cartridge memory M includes a power generator 160. The power generator 160 generates power by the action of the magnetic field applied from the non-contact type reading and writing apparatus 112 on the antenna coil 130. Specifically, the power generator 160 generates alternating-current power using a resonance circuit 152. The power generator 160 converts the generated alternating-current power into direct-current power, and outputs the direct-current power.

The power generator 160 has the resonance circuit 152 and the power supply circuit 142. The resonance circuit 152 includes the capacitor 124, the antenna coil 130, and the internal capacitor 140. The internal capacitor 140 is a capacitor incorporated in the IC chip 122, and the power supply circuit 142 is also a circuit incorporated in the IC chip 122. The internal capacitor 140 is connected in parallel with the antenna coil 130.

The capacitor 54 is a capacitor externally attached to the IC chip 122. The IC chip 122 is a general-use IC chip that is originally usable for purposes different from the magnetic tape cartridge 10. For this reason, the capacitance of the internal capacitor 140 may be insufficient to realize a resonance frequency required for the cartridge memory M used in the magnetic tape cartridge 10. Accordingly, in the cartridge memory M, the capacitor 124 is post-attached to the IC chip 122, as a capacitor having a capacitance value necessary to resonate the resonance circuit 152 at a predetermined resonance frequency by the action of the magnetic field. The predetermined resonance frequency is the same frequency as the frequency of the magnetic field, and is, for example, 13.56 MHz. The capacitance of the capacitor 124 is determined based on a measured value of the capacitance of the internal capacitor 140.

The resonance circuit 152 generates alternating-current power by generating a resonance phenomenon at the predetermined resonance frequency using the power induced by penetration of the magnetic field through the antenna coil 130, and outputs the generated alternating-current power to the power supply circuit 142.

The power supply circuit 142 has a rectification circuit, a smoothing circuit, and the like. The rectification circuit is a full-wave rectification circuit having a plurality of diodes. The full-wave rectification circuit is merely an example, and a half-wave rectification circuit may be used. The smoothing circuit includes a capacitor and a resistor. The power supply circuit 142 converts the alternating-current power inputted from the resonance circuit 152 into direct-current power and supplies the converted direct-current power (hereinafter, simply referred to as "power") to various drive elements in the IC chip 122. The various drive elements include, for example, the computer 144, the clock signal generator 146, the signal processing circuit 148, and the magnetic field intensity measurement circuit 150. In this way, the power is supplied from the power generator 160 to the various drive elements in the IC chip 122, whereby the IC chip 122 operates using the power generated by the power generator 160.

The computer 144 is an example of a "computer" according to the technique of the present disclosure, and controls the entire cartridge memory M. The computer 144 holds management information and the like written by the non-contact type reading and writing apparatus 112.

The clock signal generator 146 generates a clock signal and outputs the clock signal to the various drive elements. The various drive elements operate in accordance with the clock signal inputted from the clock signal generator 146. Although details will be described below, the clock signal generator 146 changes a frequency (hereinafter, referred to as a "clock frequency") of the clock signal in accordance with an instruction of the computer 144. In the clock signal generator 146, the same frequency as the frequency of the magnetic field is used as a clock frequency (hereinafter, referred to as a "reference clock frequency") to be a reference, and clock signals of different clock frequencies are generated based on the reference clock frequency.

The signal processing circuit 148 is connected to the resonance circuit 152. The signal processing circuit 148 has a decoding circuit (not shown) and an encoding circuit (not shown). The decoding circuit of the signal processing circuit 148 extracts and decodes a command signal from the magnetic field received by the antenna coil 130 and outputs the command signal to the computer 144.

The command signal is a signal spatially transmitted from the non-contact type reading and writing apparatus 112. Although details will be described below, the command signal is a signal to issue a command to the cartridge memory M. Inclusion of various types of command signals in the magnetic field allows spatial transmission of the various types of command signals from the non-contact type reading and writing apparatus 112 to the cartridge memory M. In other words, the command signal is superimposed on the magnetic field irradiated from the non-contact type reading and writing apparatus 112. That is, the non-contact type reading and writing apparatus 112 transmits the command signal to the cartridge memory M through the magnetic field.

The computer 144 outputs a response signal, which responds to the command signal, to the signal processing circuit 148. That is, the computer 144 executes processing appropriate to the command signal inputted from the signal processing circuit 148, and outputs a processing result as the response signal to the signal processing circuit 148. The processing appropriate to the command signal includes polling processing, read-out processing, and write-in processing. The polling processing is processing of establishing communication with the non-contact type reading and writing apparatus 112, and is executed, for example, as preparation processing in a pre-stage of the read-out processing and the write-in processing. The read-out processing is processing of reading out management information 180 and the like from a NVM (Non-Volatile Memory) 172 (see FIG. 13). The write-in processing is processing of writing the management information 180 and the like in the NVM 172.

The management information 180 is, for example, information indicating identification information capable of specifying the magnetic tape cartridge 10, a recording capacity of the magnetic tape T, the outline of information recorded on the magnetic tape T, items of the recorded information, a recording format of the recorded information, and the like.

In the signal processing circuit 148, in a case where the response signal is inputted from the computer 144, the encoding circuit of the signal processing circuit 148 encodes the response signal to modulate the response signal, and outputs the modulated response signal to the resonance circuit 152. The resonance circuit 152 transmits the response signal inputted from the encoding circuit of the signal processing circuit 148 to the non-contact type reading and writing apparatus 112 through the magnetic field. That is, in a case where the response signal is transmitted from the cartridge memory M to the non-contact type reading and writing apparatus 112, the response signal is included in the magnetic field. In other words, the response signal is superimposed on the magnetic field.

The magnetic field intensity measurement circuit 150 measures the intensity of the magnetic field based on the power generated by the power supply circuit 142. The power generated by the power supply circuit 142 becomes greater within a limit range as the intensity of the magnetic field applied to the resonance circuit 152 is greater. The magnetic field intensity measurement circuit 150 outputs a signal at an output level according to the power generated by the power supply circuit 142 based on a correlation between the power generated by the power supply circuit 142 and the intensity of the magnetic field applied to the resonance circuit 152. That is, the magnetic field intensity measurement circuit 150 measures the power generated by the power supply circuit 142. The magnetic field intensity measurement circuit 150 generates a magnetic field intensity signal indicating the intensity of the magnetic field based on a measurement result, and outputs the magnetic field intensity signal to the computer 144. The computer 144 can perform processing according to the magnetic field intensity signal inputted from the magnetic field intensity measurement circuit 150.

Figure 13:
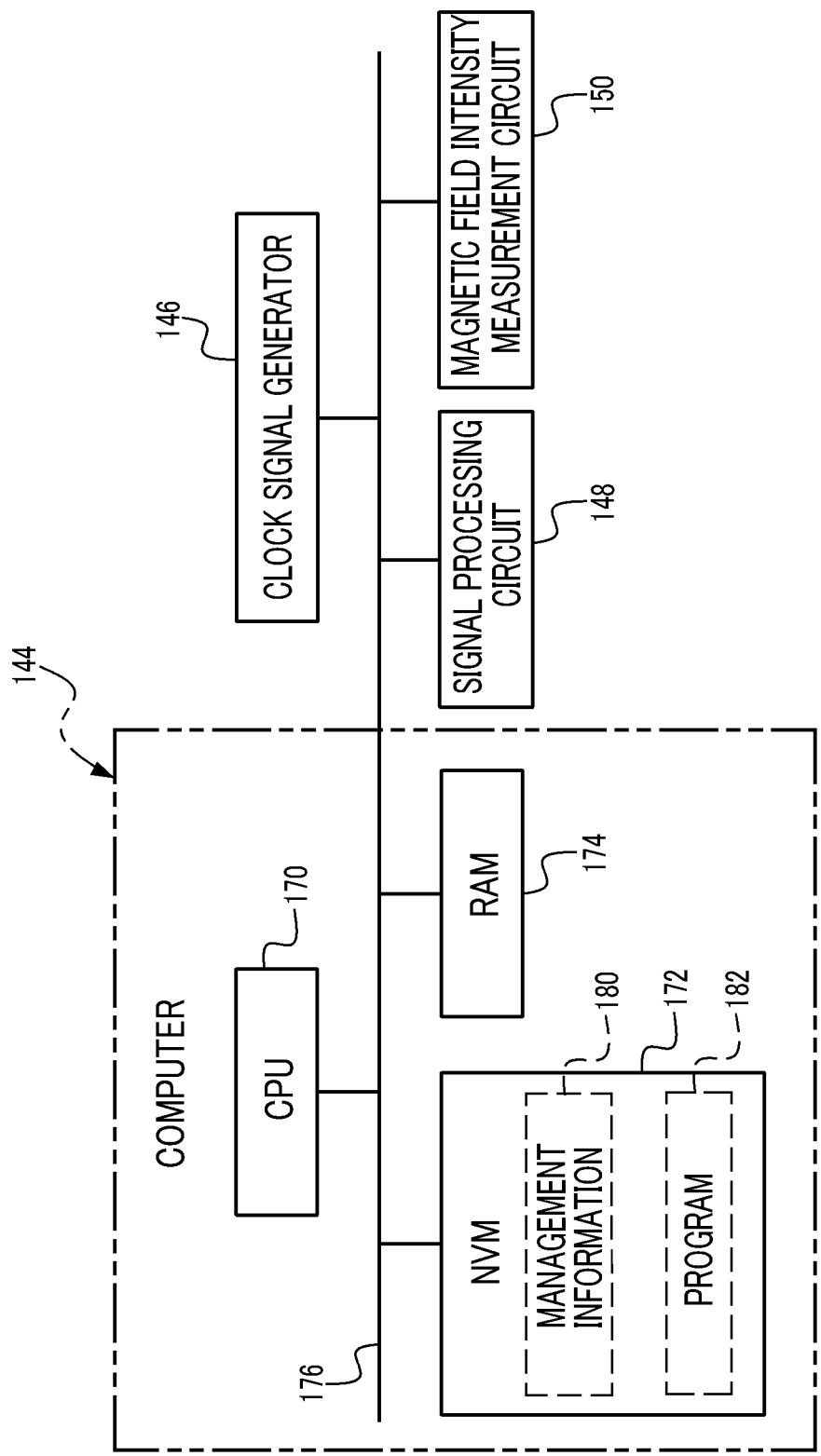
FIG. 13 is a block diagram showing an example of a hardware configuration of a computer of an IC chip mounted on the cartridge memory in the magnetic tape cartridge according to the embodiments.

As an example, as shown in FIG. 13, the computer 144 includes a CPU (Central Processing Unit) 170, the NVM 172, and a RAM (Random Access Memory) 174. The CPU 170, the NVM 172, and the RAM 174 are connected to a bus 176. The clock signal generator 146, the signal processing circuit 148, and the magnetic field intensity measurement circuit 150 are also connected to the bus 176.

The NVM 172 is, for example, an EEPROM (Electrically Erasable Programmable Read-Only Memory). The NVM 172 may be a ferroelectric memory, instead of the EEPROM, or any type of memory may be used as long as the memory is a nonvolatile memory that can be mounted on the IC chip 122.

The management information 180 is stored in the NVM 172. The CPU 170 selectively performs polling processing, read-out processing, and write-in processing according to the command signal inputted from the signal processing circuit 148. The CPU 170 performs the various types of processing at processing speeds according to the clock frequencies. Accordingly, the processing speed increases with increase in the clock frequency. Increase in the processing speed results in increase in a load imposed on the CPU 170 and increase in power consumption.

In the NVM 172, a program 182 is stored. The CPU 170 reads out the program 182 from the NVM 172 to the RAM 174, and performs the various types of processing based on the program 182 read to the RAM 174. In this embodiment, the CPU 170 performs crosstalk detection processing and the characteristic change processing, besides the polling processing, the read-out processing, and the write-in processing.

The CPU 170 performs the crosstalk detection processing to detect whether or not crosstalk occurs, based on the magnetic field intensity signal outputted from the magnetic field intensity measurement circuit 150. The crosstalk occurs in a magnetic tape cartridge 10 other than a magnetic tape cartridge 10 to be accessed by the non-contact type reading and writing apparatus 112. In the magnetic tape cartridge 10 in which the crosstalk occurs, an electromotive force is produced at a low level by the action of a weak magnetic field from the non-contact type reading and writing apparatus 112 to the antenna coil 130. Accordingly, the magnetic field intensity measurement circuit 150 outputs a low level of the magnetic field intensity signal. In the present embodiment, the CPU 170 determines that crosstalk occurs, in a case where the intensity of the magnetic field intensity signal outputted from the magnetic field intensity measurement circuit 150 is kept at a predetermined value or less for a predetermined time.

In a case where crosstalk has detected in the crosstalk detection processing, the CPU 170 performs the characteristic change processing, which disables communication by changing the characteristic of the IC chip 122 as the communication circuit. In this embodiment, in the characteristic change processing, the CPU 170 controls the clock signal generator 146 to set the clock frequency of the clock signal generated by the clock signal generator 146 higher than the reference clock frequency. Increase in the clock frequency causes increase in the processing speed, and therefore results in increase in power consumption of the IC chip 122.

In a state where the crosstalk occurs, since the power supply circuit 142 generates low power, the increase in power consumption prevents the IC chip 122 from performing normal communication operation. For example, the IC chip 122 cannot normally perform the polling processing, in response to the command transmitted from the non-contact type reading and writing apparatus 112, and cannot transmit the response signal to the non-contact type reading and writing apparatus 112. In this way, changing the characteristic of the IC chip 122 prevents the occurrence of crosstalk.

Figure 14:
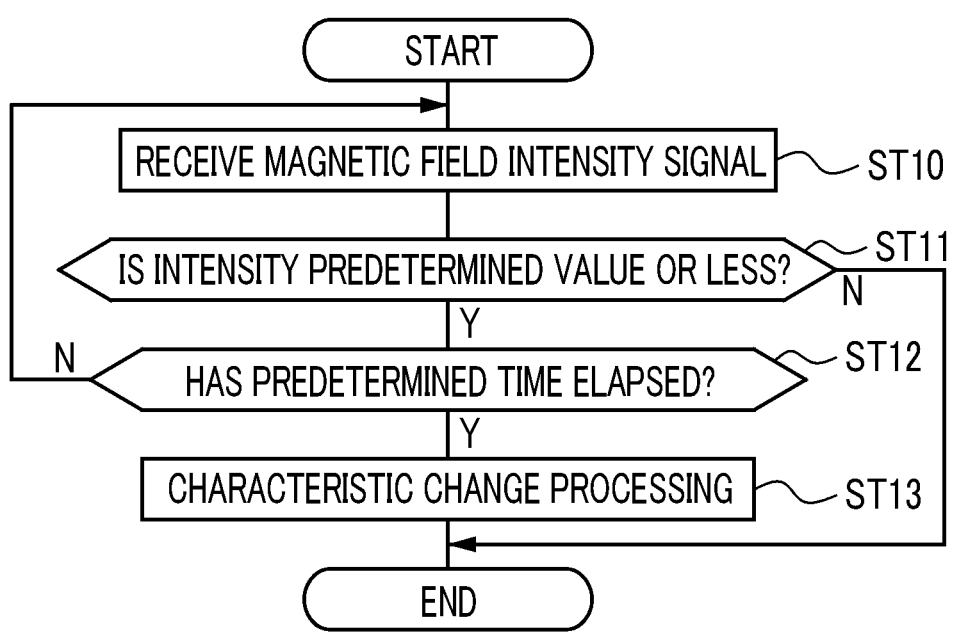
FIG. 14 is a flowchart showing an example of a flow of crosstalk detection processing and characteristic change processing according to the embodiments.

Next, the operation of the cartridge memory M will be described with reference to FIG. 14. FIG. 14 shows an example of a flow of the crosstalk detection processing and the characteristic change processing performed by the CPU 170.

Step ST10 starts upon generating an electromotive force by the antenna coil 130 by reception of a magnetic field and supplying power from the power supply circuit 142 to the computer 144, and transmitting a magnetic field intensity signal from the magnetic field intensity measurement circuit 150 to the computer 144. In Step ST10, in a case where the CPU 170 receives the magnetic field intensity signal, the processing goes to Step ST11.

In Step ST11, the CPU 170 determines whether or not the intensity of the received magnetic field intensity signal is a predetermined value or less. In a case where the intensity of the magnetic field intensity signal is not the predetermined value or less, the determination is negative in Step ST11, and the processing ends. In a case where the intensity of the magnetic field intensity signal is the predetermined value or less, the determination is affirmative in Step ST11, and the processing goes to Step ST12.

In Step ST12, the CPU 170 determines whether or not a predetermined time has elapsed. In a case where the predetermined time has not elapsed, the determination is negative in Step ST12, and the processing goes to Step ST10. In a case where the predetermined time has elapsed (that is, in a case where a time during which the intensity is the predetermined value or less has reached the predetermined time), the determination is affirmative in Step ST12, and the processing goes to Step ST13. Steps ST10 to ST12 correspond to the crosstalk detection processing described above. An affirmation of the determination in Step ST12 corresponds to the detection of crosstalk.

Figure 15:
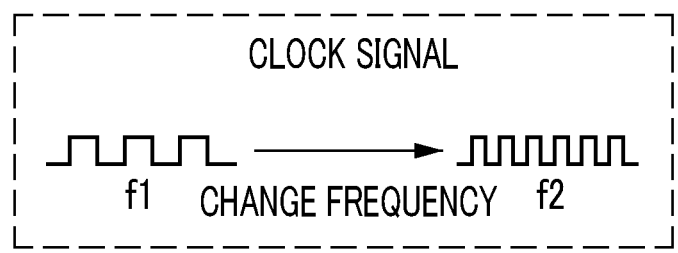
FIG. 15 is a diagram showing an example of the characteristic change processing according to the embodiments.

In Step ST13, the CPU 170 performs the characteristic change processing to disable communication of the IC chip 122 as the communication circuit. To be more specific, as shown in FIG. 15, the CPU 170 changes the clock frequency of the clock signal generated by the clock signal generator 146 to a clock frequency f2 that is higher than a reference clock frequency f1. The clock frequency f2 is, for example, twice as high as the reference frequency f1. As described above, the IC chip 122 is unable to communicate due to increase in power consumption. Then, the processing ends.

As described above, in the magnetic tape cartridge 10, in a case where crosstalk has detected, communication operation is disabled between the IC chip 122 and the non-contact type reading and writing apparatus 112 by performing the characteristic change processing to disable communication of the IC chip 122 as the communication circuit, and thus preventing the occurrence of crosstalk.

Figure 16:
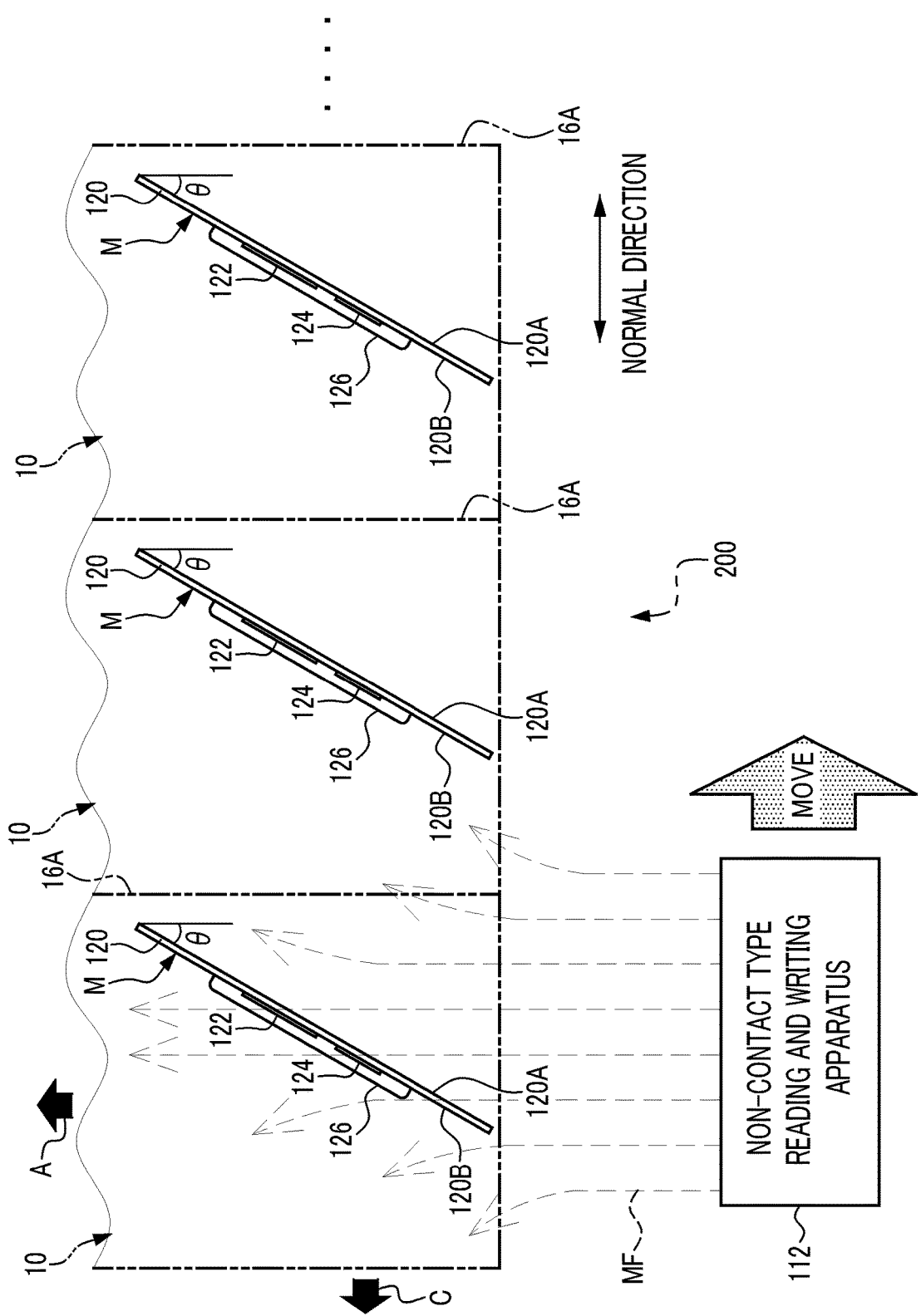
FIG. 16 is a conceptual drawing showing an example of a state in which a magnetic field is applied to packages of a plurality of the magnetic tape cartridges according to the embodiments.

As an example, as shown in FIG. 16, in a production process of the magnetic tape cartridge, a management process of the magnetic tape cartridge 10, and/or a distribution process (for example, a distribution process in a market) for distributing the magnetic tape cartridge 10, the non-contact type reading and writing apparatus 112 reads and writes the management information 180 and the like to and from the cartridge memory M of each of the magnetic tape cartridges 10 included in a magnetic tape cartridge unit 200. The magnetic tape cartridge unit 200 is constituted of, for example, a plurality of the magnetic tape cartridges 10, which are stacked in the height direction, packaged in a plastic film.

Reading and writing of the management information 180 and the like from and to the cartridge memory M by the non-contact type reading and writing apparatus 112 are performed on a rear side of the magnetic tape cartridge 10 while moving the non-contact type reading and writing apparatus 112 along the stacking direction of the plurality of magnetic tape cartridges 10. In this case, for example, the non-contact type reading and writing apparatus 112 sequentially emits a magnetic field MF to each of the magnetic tape cartridges 10 while repeatedly turning on and off the emission of the magnetic field MF.

By the way, in an environment (under a first environment) in which the magnetic tape cartridge 10 is loaded into the magnetic tape drive 110 (see FIG. 7), a magnetic field (first magnetic field) is applied from the downward direction or the upward direction of the magnetic tape cartridge 10 by the non-contact type reading and writing apparatus 112 from a side opposite the reference plane to the back surface 120A (coil forming surface), which has the antenna coil 130 formed therein, of the substrate 120.

On the contrary, in an environment (under a second environment) of at least one of the production process, the management process, or the distribution process, as shown in FIG. 16, the non-contact type reading and writing apparatus 112 applies the magnetic field MF (second magnetic field) from a side across a normal direction of the reference plane (that is, a front surface of the bottom plate 16A) and confronting the back surface 120A. The second environment is an environment in which the magnetic tape cartridges 10 are present outside the magnetic tape drive 110, as the magnetic tape cartridge unit 200.

In the second environment, as shown in FIG. 16, the magnetic field MF emitted from the non-contact type reading and writing apparatus 112 is also applied to a magnetic tape cartridge 10 adjacent to a magnetic tape cartridge 10 to be accessed. Thus, in a cartridge memory M of the magnetic tape cartridge 10 other than the magnetic tape cartridge 10 to be accessed, an antenna coil 130 may generate an electromotive force. As described above, since the cartridge memory M has an inclination angle θ of less than 45 degrees, the possibility of occurrence of crosstalk is low. However, even if the crosstalk occurs, the above-described characteristic change processing disables communication operation. Therefore, it is possible to prevent communication between the non-contact type reading and writing apparatus 112 and the cartridge memory M of the magnetic tape cartridge 10 other than the magnetic tape cartridge 10 to be accessed, namely the crosstalk.

Accordingly, it is possible to prevent reading and writing of the management information 180 and the like from and to the improper magnetic tape cartridge 10. As a result, for example, in the production process of the magnetic tape cartridges 10, the productivity of the magnetic tape cartridges 10 is improved without increase in facility costs. In the management process of the magnetic tape cartridges 10, efficiency in the management of the magnetic tape cartridges 10 is improved without increase in facility costs.

A non-contact management method of the magnetic tape cartridges according to the present disclosure includes applying the first magnetic field from the side opposite the reference plane to the coil forming surface in the first environment; and applying the second magnetic field from the side across the normal direction of the reference plane and confronting the coil forming surface to the coil forming surface in the second environment.

In the example shown in FIG. 16, the magnetic tape cartridge unit 200 is fixed and non-contact type reading and writing apparatus 112 is moved, but on the contrary, the non-contact type reading and writing apparatus 112 may be fixed and the magnetic tape cartridge unit 200 may be moved. Any one or both of the magnetic tape cartridge unit 200 and the non-contact type reading and writing apparatus 112 may be moved, as long as the magnetic tape cartridge unit 200 and the non-contact type reading and writing apparatus 112 are relatively moved.

Modification Example

In the second embodiment, in the characteristic change processing, the clock frequency of the clock signal generated by the clock signal generator 146 is increased in order to disable communication of the IC chip 122, as the communication circuit. Instead of this, in the characteristic change processing, a minimum operation power of the IC chip 122 may be increased to disable communication of the IC chip 122.

In this case, in the case of detecting crosstalk, the CPU 170 increases the minimum operation power of the IC chip 122, so the power consumption of the IC chip 122 is increased. Accordingly, just as in the case of increasing the clock frequency, communication is disabled owing to power shortage of the IC chip 122. In a case where an electromotive force of the antenna coil 130 is small, power generated by the power supply circuit 142 is smaller than the minimum operation power, and hence the IC chip 122 does not operate. The minimum operation power is changed by changing any one or both of a minimum operation voltage and a minimum operation current. For example, the power supply circuit 142 has a UVLO (Under Voltage Lock Out) function, and thereby the CPU 170 is able to change the minimum operation voltage of the power supply circuit 142.

Figure 17:
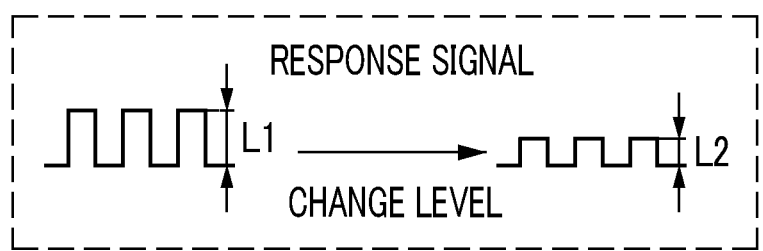
FIG. 17 is a drawing showing another example of the characteristic change processing according to the embodiments.

The CPU 170 may decrease the level of the response signal generated by the signal processing circuit 148, in order to disable communication of the IC chip 122. In the case of detecting crosstalk, as shown in FIG. 17, the CPU 170 decreases the level of the response signal to a level L2 that is lower than a reference level L1. The level refers to a high-level voltage value (namely, an amplitude value) with respect to a low level of the response signal. Accordingly, the decrease in the level of the response signal disables communication of the IC chip 122. The decrease in the level of the response signal includes dropping the level to 0.

In the second embodiment, the IC chip 122 itself included in the cartridge memory M of the magnetic tape cartridge performs the crosstalk detection processing, and, in the case of detecting crosstalk, the IC chip 122 itself changes the characteristic (the clock frequency, the minimum operation power, or the level of the response signal) in order to disable communication with the non-contact type reading and writing apparatus 112. Instead of this, the non-contact type reading and writing apparatus 112 may perform the crosstalk detection processing, and the non-contact type reading and writing apparatus 112 may transmit a characteristic change command to change the characteristic of the IC chip 122 to the cartridge memory M of the magnetic tape cartridge 10. The non-contact type reading and writing apparatus 112 is an example of a "communication device" according to the technique of the present disclosure.

Figure 18:
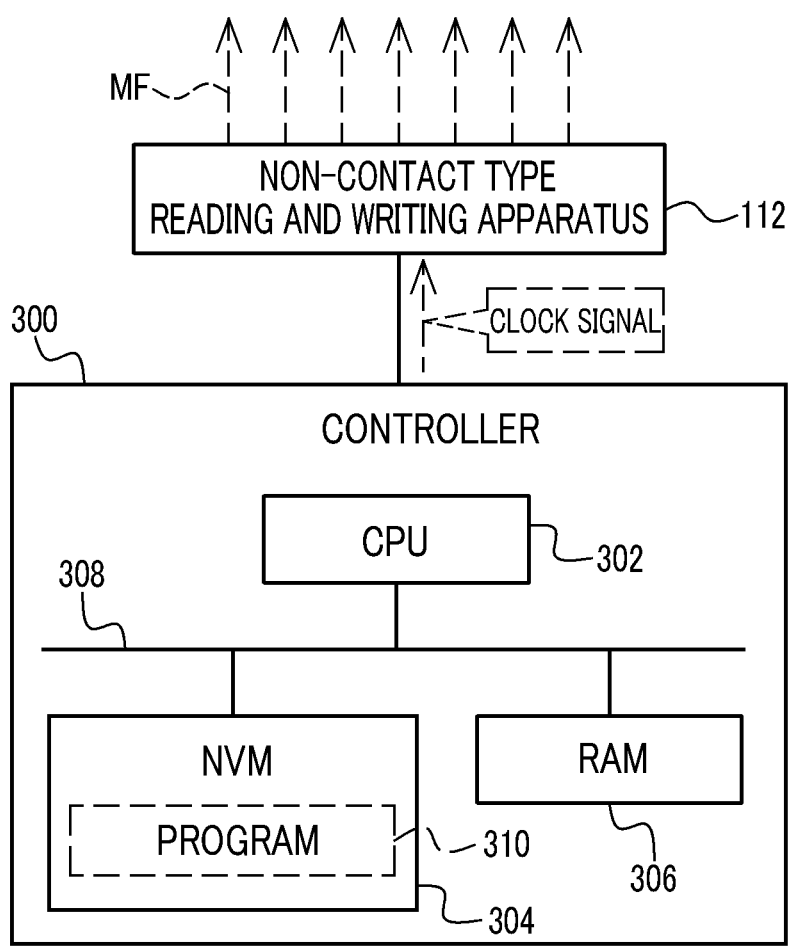
FIG. 18 is a block diagram showing a hardware structure of a controller for controlling a non-contact type reading and writing apparatus according to the embodiments.

As an example, as shown in FIG. 18, the non-contact type reading and writing apparatus 112 is connected to a controller 300. The controller 300 outputs a control signal to control the cartridge memory M to the non-contact type reading and writing apparatus 112. The non-contact type reading and writing apparatus 112 emits a magnetic field MF to the cartridge memory M in accordance with the control signal inputted from the controller 300. On the magnetic field MF, various types of command signals, including a polling command, a read-out command, and a write-in command, are superimposed in accordance with the control signal. In the case of changing the characteristic of the IC chip 122, a characteristic change command is superimposed on the magnetic field MF.

The controller 300 is constituted of a computer including, for example, a CPU 302, a NVM 304, and a RAM 306. In the NVM 304, a program 310 is stored. The CPU 302 reads out the program 310 from the NVM 304 to the RAM 306, and performs various types of processing based on the program 310 read to the RAM 306. The CPU 302 is an example of a "processor" according to the technique of the present disclosure. The RAM 306 is an example of a "memory" according to the technique of the present disclosure. The memory may be an internal memory incorporated in the processor.

Figure 19:
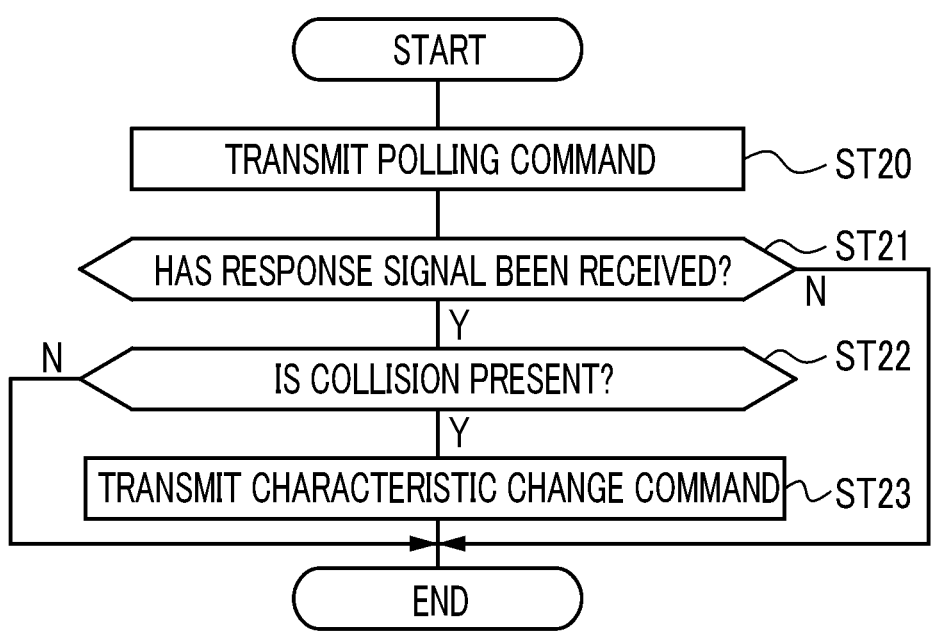
FIG. 19 is a flowchart showing an example of a flow of processing performed by the controller for controlling the non-contact type reading and writing apparatus according to the embodiments.

Next, the operation of the non-contact type reading and writing apparatus 112 will be described with reference to FIG. 19. FIG. 19 shows an example of a flow of processing in which the non-contact type reading and writing apparatus 112 transmits a polling command to the magnetic tape cartridge 10.

First, in Step ST20, the non-contact type reading and writing apparatus 112 transmits a polling command to a magnetic tape cartridge 10 to be accessed, under control of the controller 300. Then, the processing goes to Step ST21.

In Step ST21, the controller 300 determines whether or not the non-contact type reading and writing apparatus 112 has received a response signal from the magnetic tape cartridge 10. In a case where the non-contact type reading and writing apparatus 112 has not received the response signal, the determination is negative in Step ST21, and the processing ends. In a case where the non-contact type reading and writing apparatus 112 has received the response signal, the determination is affirmative in Step ST21, and the processing goes to Step ST22.

In Step ST22, the controller 300 determines whether or not a collision is present, based on response signals received by the non-contact type reading and writing apparatus 112. The collision refers to a simultaneous reception of the response signals by the non-contact type reading and writing apparatus 112 from a plurality of magnetic tape cartridges 10. That is, the occurrence of the collision corresponds to the occurrence of crosstalk. In a case where the collision is not present, the determination is negative in Step ST22, and the processing ends. In a case where the collision is present, the determination is affirmative in Step ST22, and the processing goes to Step ST23.

In Step ST23, the non-contact type reading and writing apparatus 112 transmits a characteristic change command under control of the controller 300. The non-contact type reading and writing apparatus 112 transmits the characteristic change command to, for example, a magnetic tape cartridge 10 other than the magnetic tape cartridge 10 to be accessed. In a case where the magnetic tape cartridge 10 receives the characteristic change command, the CPU 170 changes the characteristic of the IC chip 122 in the cartridge memory M. The characteristic to be changed is any of the clock frequency, the minimum operation power, and the level of the response signal, as described above. Changing the characteristic of the IC chip 122 disables communication, and hence restrains crosstalk. Then, the processing ends.

Figure 20:
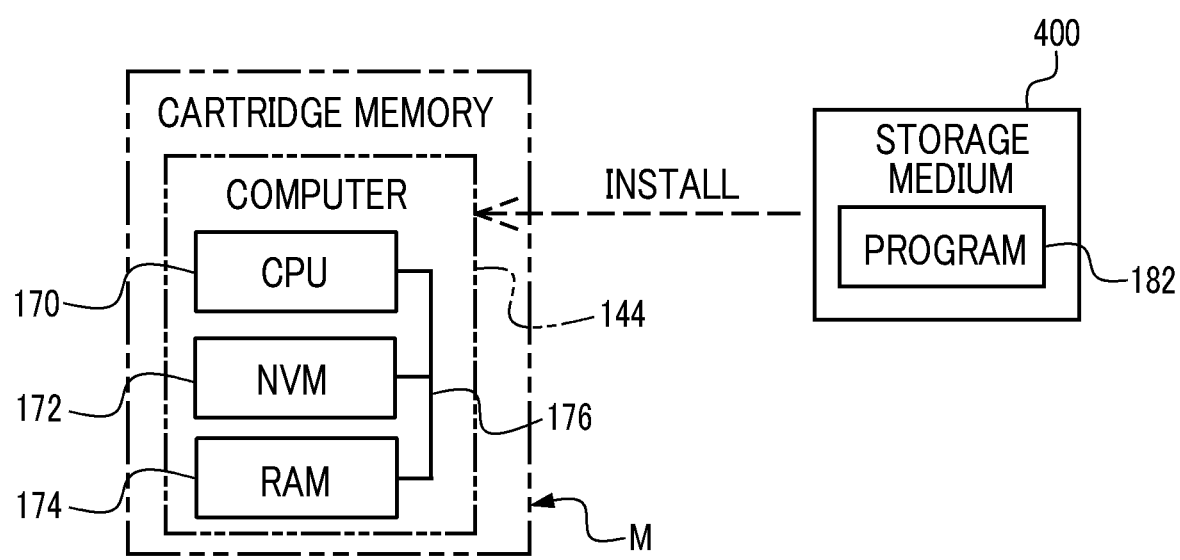
FIG. 20 is a block diagram showing an example of a state in which a program is installed to the computer from a storage medium that stores the program according to the embodiments.

In the example shown in FIG. 13, although an aspect in which the program 182 is stored in the NVM 172 is exemplified, the technique of the present disclosure is not limited thereto. For example, as shown in FIG. 20, the program 182 may be stored in a storage medium 400. The storage medium 400 is a non-temporary storage medium. As an example of the storage medium 400, there is any portable storage medium, such as an SSD (Solid State Drive) or a USB (Universe Serial Bus) memory.

The program 182 stored in the storage medium 400 is installed in the computer 144. The CPU 170 performs processing in accordance with the program 182. In an example shown in FIG. 20, the CPU 170 is a single CPU, but may be a plurality of CPUs.

Alternatively, the program 182 may be stored in a storage unit of another computer, a server device, or the like connected to the computer 144 through a communication network (not shown), and the program 182 may be downloaded in response to a request from the cartridge memory M and installed on the computer 144.

Similarly, the program 310 shown in FIG. 18 may be stored in a non-temporary storage medium. The CPU 302 may be a plurality of CPUs.

In the examples shown in FIGS. 13 and 18, although the CPUs 170 and 302 are illustrated, the technique of the present disclosure is not limited thereto, and a device including at least one of an ASIC (Application Specific Integrated Circuit), an FPGA (Field Programmable Gate Array), or a PLD (Programmable Logic Device) may be applied instead of the CPU 170 or 302. Alternatively, a combination of a hardware configuration and a software configuration may be used instead of the CPU 170 or 302.

A hardware resource that performs the processing may be constituted of one of various types of processors, or a combination of two or more processors of the same type or different types (for example, a combination of a plurality of FPGAs, or a combination of a CPU and an FPGA). The hardware resource that performs the processing may be constituted of a single processor.

As an example where the hardware resource is configured of one processor, first, there is a form in which one processor is configured of a combination of one or more CPUs and software, and the processor functions as the hardware resource for performing the processing. Second, as represented by SoC (System-on-a-Chip) or the like, there is a form in which a processor that realizes the function of the entire system including a plurality of hardware resources with one IC chip is used.

In addition, as the hardware structures of the various types of processors, more specifically, an electric circuit into which circuit elements, such as semiconductor elements, are combined may be used. The above-described processing is merely an example. Accordingly, it is needless to say that an unnecessary step may be deleted, a new step may be added, or a processing order may be changed without departing from the gist.

The contents of the above description and the contents of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the contents of the above description and the contents of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the contents of the above description and the contents of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A magnetic tape cartridge unit comprising a plurality of magnetic tape cartridges stacked in a height direction, each of the magnetic tape cartridges including an antenna coil formed in a substrate, a communication circuit that communicates with a communicatee using power induced by application of a magnetic field from the communicatee to the antenna coil, and a case in which a reference plane being a reference in the height direction is formed, wherein:
   the substrate is inclined at an inclination angle of less than 45 degrees with respect to the reference plane, and
   the plurality of magnetic tape cartridges are stacked in a predetermined orientation in the height direction, such that adjacent magnetic tape cartridges contact each other, the reference planes of the plurality of magnetic tape cartridges are in parallel, and the inclination angles of the substrates relative to the reference planes and positions of the substrates in the reference planes conform among the plurality of magnetic tape cartridges.

2. The magnetic tape cartridge unit according to claim 1, wherein in a case where crosstalk occurs between the communication circuit and the communicatee, the communication circuit performs a characteristic change processing, and
   wherein the characteristic change processing disables communication with the communicatee by changing a characteristic.

3. The magnetic tape cartridge unit according to claim 2, wherein
   the characteristic is a clock frequency of a clock signal, and
   in a case where the crosstalk occurs between the communication circuit and the communicatee, the communication circuit increases the clock frequency.

4. The magnetic tape cartridge unit according to claim 2, wherein
   the characteristic is a minimum operation power, and
   in a case where the crosstalk occurs between the communication circuit and the communicatee, the communication circuit increases the minimum operation power.

5. The magnetic tape cartridge unit according to claim 2, wherein
   the characteristic is a level of a response signal to be transmitted to the communicatee, and
   in a case where the crosstalk occurs between the communication circuit and the communicatee, the communication circuit decreases the level of the response signal.

6. A communication device comprising:
   a processor; and
   a memory connected to or incorporated in the processor, wherein:

the processor transmits a characteristic change command to disable communication between the communication device and a communicatee by changing a characteristic to one or more magnetic tape cartridges, in a case where crosstalk occurs between the communication device and a communication circuit included in each of the magnetic tape cartridges included in a magnetic tape cartridge unit, the magnetic tape cartridge unit includes the magnetic tape cartridges stacked in a height direction, each of the magnetic tape cartridges has an antenna coil formed in a substrate, the communication circuit that communicates with the communicatee using power induced by application of a magnetic field from the communicatee to the antenna coil, and a case in which a reference plane being a reference in the height direction is formed, the substrate is inclined at an inclination angle of less than 45 degrees with respect to the reference plane, and the magnetic tape cartridges are stacked in a predetermined orientation in the height direction in the magnetic tape cartridge unit, such that adjacent magnetic tape cartridges contact each other, the reference planes of the magnetic tape cartridges are in parallel, and the inclination angles of the substrates relative to the reference planes and positions of the substrates in the reference planes conform among the magnetic tape cartridges.

7. The communication device according to claim 6, wherein the characteristic is a clock frequency of a clock signal, a minimum operation power, or a level of a response signal.

8. A manufacturing method of a magnetic tape cartridge unit including a plurality of magnetic tape cartridges stacked in a height direction, each of the magnetic tape cartridges including an antenna coil formed in a substrate, a communication circuit that communicates with a communicatee using power induced by application of a magnetic field from the communicatee to the antenna coil, and a case in which a reference plane being a reference in the height direction is formed, the manufacturing method comprising:

inclining the substrate at an inclination angle of less than 45 degrees with respect to the reference plane; and parallelizing the reference planes of the plurality of magnetic tape cartridges, and conforming the inclination angles of the substrates with respect to the reference planes and the positions of the substrates in the reference planes among the plurality of magnetic tape cartridges, the plurality of magnetic tape cartridges being stacked in a predetermined orientation in the height direction, such that adjacent magnetic tape cartridges contact each other.

9. A noncontact management method of a magnetic tape cartridge comprising:

applying a magnetic field from a side opposite a reference plane to a coil forming surface of a substrate, an antenna coil being formed in the coil forming surface, in a first environment in which the magnetic tape cartridge is loaded into a magnetic tape drive, a plurality of the magnetic tape cartridges each including an antenna coil formed in a substrate, a communication circuit that communicates with a communicatee using power induced by application of a magnetic field from the communicatee to the antenna coil, and a case in which the reference plane being a reference in a height direction is formed, the substrate being inclined at an inclination angle of less than 45 degrees with respect to the reference plane; and applying a magnetic field from a side across a normal direction of the reference plane and confronting the coil forming surface to the coil forming surface, in a second environment in which a magnetic tape cartridge unit is present outside the magnetic tape drive, the magnetic tape cartridge unit including the plurality of the magnetic tape cartridges stacked in a predetermined orientation in the height direction, such that adjacent magnetic tape cartridges contact each other, the reference planes of the plurality of the magnetic tape cartridges being in parallel, and the inclination angles of the substrates relative to the reference planes and positions of the substrates in the reference planes conforming among the plurality of the magnetic tape cartridges.

10. The noncontact management method of the magnetic tape cartridge according to claim 9, wherein the second environment is at least one of a production process of the magnetic tape cartridge unit, a management process of the magnetic tape cartridge unit, and a distribution process to distribute the magnetic tape cartridge unit.

11. The noncontact management method of the magnetic tape cartridge according to claim 10, wherein each of the production process, the management process, and the distribution process includes a process in which a magnetic field is applied to the coil forming surface of each of the plurality of the magnetic tape cartridges included in the magnetic tape cartridge unit.

12. The noncontact management method of the magnetic tape cartridge according to claim 9, wherein the communicatee applies the magnetic field to the coil forming surface of each of the plurality of the magnetic tape cartridges, while moving along the normal direction.

* * * * *